United States Patent
Kirk et al.

(10) Patent No.: US 11,181,448 B2
(45) Date of Patent: Nov. 23, 2021

(54) CONTROLLED PRINTING OF A CELL SAMPLE FOR KARYOTYPING

(71) Applicant: Biodot, Inc., Irvine, CA (US)

(72) Inventors: Brian L. Kirk, Carlsbad, CA (US); Anthony V. Lemmo, Mission Viejo, CA (US); Thomas C. Tisone, Orange, CA (US)

(73) Assignee: BIODOT, INC., Irvine, CA (US)

( * ) Notice: Subject to any disclaimer, the term of this patent is extended or adjusted under 35 U.S.C. 154(b) by 134 days.

(21) Appl. No.: 14/440,843

(22) PCT Filed: Nov. 4, 2013

(86) PCT No.: PCT/US2013/068321
§ 371 (c)(1),
(2) Date: May 5, 2015

(87) PCT Pub. No.: WO2014/074456
PCT Pub. Date: May 15, 2014

(65) Prior Publication Data
US 2015/0300929 A1 Oct. 22, 2015

Related U.S. Application Data

(60) Provisional application No. 61/723,278, filed on Nov. 6, 2012.

(51) Int. Cl.
*G01N 1/28* (2006.01)
*G01N 1/31* (2006.01)
*G01N 35/10* (2006.01)

(52) U.S. Cl.
CPC .......... *G01N 1/2813* (2013.01); *G01N 1/312* (2013.01); *B01J 2219/00378* (2013.01); *B01J 2219/00527* (2013.01); *B01J 2219/00743* (2013.01); *G01N 2035/1023* (2013.01)

(58) Field of Classification Search
CPC .................. G01N 1/2813; G01N 1/312; B01J 2219/00378
See application file for complete search history.

(56) References Cited

U.S. PATENT DOCUMENTS

| 4,575,490 A | 3/1986 | Ornstein et al. |
|---|---|---|
| 4,748,043 A | 5/1988 | Seaver et al. |
| 5,008,185 A | 4/1991 | Bacus |
| 5,041,266 A | 8/1991 | Fox |
| 5,132,097 A | 7/1992 | Van Deusen et al. |
| H1099 H | 9/1992 | Sayler |
| 5,257,657 A | 11/1993 | Gore |
| 5,445,934 A | 8/1995 | Fodor et al. |
| 5,486,337 A | 1/1996 | Ohkawa |
| 5,509,966 A | 4/1996 | Sykes |
| 5,658,802 A | 8/1997 | Hayes et al. |
| 5,707,588 A | 1/1998 | Tsukishima |
| 5,741,554 A | 4/1998 | Tisone |
| 5,743,960 A | 4/1998 | Tisone |
| 5,744,305 A | 4/1998 | Foder et al. |
| 5,776,748 A | 7/1998 | Singhvi et al. |
| 5,891,712 A | 4/1999 | May |
| 5,981,733 A | 11/1999 | Gamble et al. |
| 6,004,617 A | 12/1999 | Schultz et al. |
| 6,063,339 A | 5/2000 | Tisone et al. |
| 6,103,479 A | 8/2000 | Taylor |
| 6,121,048 A | 9/2000 | Zaffaroni et al. |
| 6,168,915 B1 | 1/2001 | Scholl et al. |
| 6,215,894 B1 | 4/2001 | Zeleny et al. |
| 6,220,075 B1 | 4/2001 | Papen et al. |
| 6,232,066 B1 | 5/2001 | Felder et al. |
| 6,287,850 B1 | 9/2001 | Besemer et al. |
| 6,296,809 B1 | 10/2001 | Richards et al. |
| 6,309,831 B1 | 10/2001 | Goldberg et al. |
| 6,358,682 B1 | 3/2002 | Jaffee et al. |
| 6,387,707 B1 | 5/2002 | Seul et al. |
| 6,391,623 B1 | 5/2002 | Besemer et al. |
| 6,416,952 B1 | 7/2002 | Pirrung et al. |

(Continued)

FOREIGN PATENT DOCUMENTS

| CA | 2529016 A1 | 6/2004 |
|---|---|---|
| DE | 198 41 554 A1 | 3/2000 |

(Continued)

OTHER PUBLICATIONS

Hansson, A. et al.; "Analysis of proliferation, apoptosis and keratin expression in cultured normal and immortalized human buccal keratinocytes"; Eur J Oral Sci; Feb. 2003; Abstract.

(Continued)

*Primary Examiner* — Blaine Lankford
(74) *Attorney, Agent, or Firm* — Knobbe, Martens, Olson & Bear, LLP

(57) ABSTRACT

Methods and techniques for controlled printing of a cell sample for karyotyping are provided. The methods can involve matrix printing using on-the-fly printing or dispensing to accurately spread cells within at least one cell sample on a surface in preparation for karyotyping, and further analysis. Advantageously, the methods result in a uniform distribution of chromosomes of the cell suspension or sample on the surface of a substrate which can be substantially discretely identified, and also provide for efficiency in a subsequent staining process and any further analysis of the stained chromosomes using a microscope or other imaging device.

49 Claims, 10 Drawing Sheets

(56) References Cited

U.S. PATENT DOCUMENTS

| | | |
|---|---|---|
| 6,521,187 B1 | 2/2003 | Papen |
| 6,537,505 B1 | 3/2003 | Labudde et al. |
| 6,548,263 B1 | 4/2003 | Kapur et al. |
| 6,576,295 B2 | 6/2003 | Tisone |
| RE38,281 E | 10/2003 | Tisone |
| 6,710,335 B2 | 3/2004 | Ellson et al. |
| 6,713,021 B1 | 3/2004 | Shvets et al. |
| 6,797,945 B2 | 9/2004 | Berggren et al. |
| 6,838,051 B2 | 1/2005 | Marquiss et al. |
| 6,881,579 B2 | 4/2005 | Hilson et al. |
| 6,890,485 B1 | 5/2005 | Stylli et al. |
| 6,916,620 B2 | 7/2005 | Qiao et al. |
| 6,929,944 B2 | 8/2005 | Matson |
| 6,995,024 B2 | 2/2006 | Smith et al. |
| 7,141,368 B2 | 11/2006 | Fisher et al. |
| 7,179,423 B2 | 2/2007 | Bohm et al. |
| 7,199,809 B1 | 4/2007 | Lacy et al. |
| 7,211,223 B2 | 5/2007 | Fouillet et al. |
| 7,312,068 B2 | 12/2007 | Pinkel et al. |
| 7,332,347 B2 | 2/2008 | Li et al. |
| 7,442,499 B2 | 10/2008 | Brown et al. |
| 7,754,439 B2 | 7/2010 | Moore et al. |
| 8,323,882 B2 | 12/2012 | Moore et al. |
| 8,940,478 B2 | 1/2015 | Moore et al. |
| 2002/0064482 A1 | 5/2002 | Tisone et al. |
| 2002/0092366 A1 | 7/2002 | Brock et al. |
| 2002/0127565 A1 | 9/2002 | Cunningham et al. |
| 2002/0151085 A1 | 10/2002 | Zaffaroni et al. |
| 2002/0158027 A1 | 10/2002 | Moon et al. |
| 2002/0159919 A1 | 10/2002 | Churchill et al. |
| 2002/0168297 A1 | 11/2002 | Shvets et al. |
| 2003/0143756 A1 | 7/2003 | Fisher et al. |
| 2003/0148538 A1 | 8/2003 | Ng |
| 2003/0175163 A1 | 9/2003 | Shvets et al. |
| 2003/0228241 A1 | 12/2003 | Legge |
| 2004/0009611 A1 | 1/2004 | Williams et al. |
| 2004/0052955 A1 | 3/2004 | Tisone |
| 2004/0072364 A1 | 4/2004 | Tisone et al. |
| 2004/0091398 A1 | 5/2004 | Gilbert et al. |
| 2004/0265185 A1 | 12/2004 | Kitagawa |
| 2005/0003458 A1 | 1/2005 | Moore et al. |
| 2005/0042767 A1 | 2/2005 | Machida et al. |
| 2005/0232823 A1 | 10/2005 | Brock et al. |
| 2006/0211132 A1 | 9/2006 | Miledi et al. |
| 2006/0240400 A1 | 10/2006 | Yamato et al. |
| 2006/0263264 A1 | 11/2006 | Bohm et al. |
| 2007/0249060 A1 | 10/2007 | Kirschner et al. |
| 2008/0226498 A1 | 9/2008 | Stylli et al. |
| 2008/0227663 A1* | 9/2008 | Tisone ............... B01J 19/0046 506/39 |
| 2010/0273680 A1 | 10/2010 | Moore et al. |
| 2014/0005060 A1 | 1/2014 | Moore et al. |
| 2015/0119283 A1 | 4/2015 | Moore et al. |

FOREIGN PATENT DOCUMENTS

| | | |
|---|---|---|
| DE | 199 05 490 A1 | 8/2000 |
| EP | 1 179 364 A2 | 2/2002 |
| EP | 1 179 368 A2 | 2/2002 |
| EP | 1 654 346 A2 | 5/2006 |
| EP | 1 658 894 A1 | 5/2006 |
| WO | WO 99/34931 A1 | 7/1999 |
| WO | WO 03/072258 A1 | 9/2003 |
| WO | WO 2004/11161 A2 | 12/2004 |
| WO | WO 2004/111610 A2 | 12/2004 |

OTHER PUBLICATIONS

Office action from European Patent Office in corresponding European Application No. 04 754 938.1, dated Jun. 9, 2008, 5 pp.

Office action from European Patent Office in corresponding European Application No. 04 754 938.1, dated May 26, 2011, 4 pp.

Wilson, W. Cris, Jr. et al.; "Cell and Organ Printing 1: Protein and Cell Printers"; The Anatomical Record Part A 272A: 491-496 (2003).

Office Action dated Jun. 10, 2016, European Application No. 13789691.6; 4 pages.

Wilson, Cris W., Jr. et al.; "Cell and Organ Printing 1: Protein and Cell Printers"; The Anatomical Record Part A 272;491-496 (2003); 6 pages.

International Search Report; PCT/US2013/068321; dated Jan. 17, 2014; 3 pages.

* cited by examiner

CONTROLLED PRINTING OF A CELL SAMPLE FOR KARYOTYPING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The invention relates generally to controlled printing of a cell sample for karyotyping, and more particularly to matrix printing of cell samples using on-the-fly printing or dispensing to accurately spread cells within at least one cell sample on a surface in preparation for karyotyping, and further analysis.

BACKGROUND INFORMATION

Karyotyping is a test to examine chromosomes in a sample of cells, which can help identify genetic problems as the cause of a disorder or disease. This test can count the number of chromosomes and look for structural changes in chromosomes.

The test can be performed on many tissues, such as, amniotic fluid, blood, bone marrow, tissue from the organ that develops during pregnancy to feed a growing baby (placenta), and the like, among others.

Typically, the sample is placed into a receptacle, dish or tube and allowed to grow in the laboratory. Cells are later taken from the new sample and stained. A laboratory specialist uses a microscope to examine the size, shape, and number of chromosomes in the cell sample. The stained sample is photographed to show the arrangement of the chromosomes. This is sometimes called a karyotype in the art.

Certain problems can be identified through the number or arrangement of the chromosomes. Chromosomes contain thousands of genes that are stored in DNA, the basic genetic material.

SUMMARY

Various manual methods of dispensing cells onto slides for karyotyping exist in the literature. These manual protocols vary with respect to the volume of cells dispensed onto the slide, the temperature, relative humidity, the angle of the slide during the dispensing process, the height of the pipette when dispensing with respect to the slide, and whether liquid should be applied to the slide before or after the cells are dispensed, and these protocols have been implemented to affect the speed and manner in which the cells dry on the slide.

Disadvantageously, these manual techniques are time consuming, costly, and can suffer from inaccuracies given at least in part due to the manual methodology and control of the large number of variables involved in the process.

It is one advantage of certain embodiments of the invention to provide methods and techniques to overcome the deficiencies and improve the accuracy and efficiency of conventional dispensing techniques for preparation of cells on a substrate surface, or the like, for karyotyping analysis.

In the process of preparing a substrate, such as a microscope glass slide or the like, for karyotyping, the application of cells to a microscope slide is one important step. This method, commonly referred to as "dropping," in the conventional art is a manual approach in which cells are dispensed onto a slide using a manual pipette. The cells can then be analyzed by a technologist once the cells have been stained. One principle aim of the dropping process is to dispense cells onto a microscope slide in such a way that the cells that have condensed their genetic information into visible and distinct chromosomes, commonly referred to as metaphase cells, and are: spread to the point where chromosomes can be uniquely identified; dried in a way that they properly accept the stain used for visualizing the cells under a microscope; and in sufficient number on the slide to result in a definitive conclusion.

If the cells are not applied to the slide properly, they may not accept the stain adequately. Poorly spread cells may also make it difficult for a technologist to differentiate information from individual cells or from individual chromosomes within a single cell. These are some of the disadvantages in conventional karyotyping techniques, which certain embodiments disclosed herein overcome.

The conventional manual dropping method is performed by dispensing, for example, about 100 microliters (µL) to about 200 µL of a cell solution onto an angled slide to allow the solution to cascade down the slide as the cell solution dries. The slide angle range is typically between about 20 degrees and about 60 degrees.

Undesirably, though this angle is believed to provide certain benefits, these for the most are not accomplished. Since this conventional dropping method is performed manually, disadvantageously, most technicians or practitioners create the slide angle by holding the slides without the aid of a tool or measuring devices. Undesirably, the variable slide angles can contribute to inconsistencies in slide quality from slide to slide, from a given technician and from technician to technician. Even some automation does not remedy most, if not all, of these deficiencies.

Embodiments of the invention taught herein provide new array capabilities in the area of karyotyping relative to arrays. In some embodiments, laboratories and the like are provided with the ability to automate the existing dispense protocol in which a single sample is applied to the entire area of a glass slide.

As noted above, the most widely accepted manual method of applying cells to slides requires that the operator angle the slides during the deposition step. This angle gives the cells within the sample fluid forward momentum that helps the cells spread across the slide. The angle is also believed to enhance the spreading of individuals cells (specifically the individual chromosomes within cells that are analyzed for Karyotyping).

Maintaining an angled slide in an automated setting can significantly complicate the design of existing and future automated systems. An automated method for applying samples to slides using the generally accepted protocols except for slide angle (e.g., sample volume, slide temperature, humidity, etc.), can complicate and compromise consistency producing acceptable slides with respect to cell dispersion on the slide and individual cell spreading (chromosomes). However, other innovative techniques, in accordance with certain embodiments, based on novel modifications to this underlying approach have been proven to be successful.

To either extrapolate, mimic or improve the fundamental principles behind the use of angled slides in the dispensing method, and in order to apply forward momentum to the cells when they impact the slide, in accordance with certain embodiments, a dispense method is provided that dispenses or prints discrete droplets on a slide or substrate while the dispense head moves in a substantially continuous motion. Desirably, by moving the dispense head while dispensing, the forward velocity of the dispense head transfers forward velocity to the droplet as it moves towards the surface of the slide. Advantageously, the implementation of such a technique greatly enhances the spreading of the cells across the slide or substrate.

The forward momentum allows the cells to disperse evenly across the slide or substrate, such as, during the drying process. This greatly improves the way cells are displayed on the slide or substrate (e.g., the cell membrane disappears, chromosomes become flat, and chromosomes spread so that they can be uniquely identified).

Moreover, the forward momentum allows for the cells in suspension to spread evenly across the slide or substrate so that each cell can be identified independently. Evenly spread cells, both interphase nuclei and metaphase nuclei, should desirably not overlap or clump. Overlapping cells can be difficult to use for analysis and if a slide or substrate does not produce the proper number of cells that can be analyzed definitively, then that slide or substrate most likely will have to be discarded and the dropping process repeated. Also, if the cells clump together, they typically do not allow the chromosomes within a metaphase cell to spread adequately so that each chromosome can be uniquely identified.

Embodiments of the invention overcome some or all of these issues by providing novel and innovative methods and techniques of automated on-the-fly dispensing and printing of at least one cell sample uniformly, consistently and reproducibility on a substrate that the substrate is available for accurate preparation of karyotyping and further analysis, as needed or required.

In accordance with some embodiments, a method utilizing "Line mode" is used to apply continuous lines of spots onto a slide or substrate. Line mode is a method of dispensing in which small droplets (in the picoliter to nanoliter scale or order of magnitude) are dispensed onto a surface by a printing nozzle to generate a line of individual droplets with a specific spacing and volume. In one example, without limitation: each line was dispensed at about 50 mm/sec, about 20 drops per line, about 500 nanoliters (nl) per drop, and about 2 mm spacing per drop; 6 lines were applied to the substrate or slide (60 µL per slide).

In accordance with some embodiments, a method of printing a cell sample for karyotyping is provided. The method involves dispensing droplets from a moving nozzle onto a substrate. The dispensing comprising on-the-fly dispensing of cells on the substrate. At least one of the speed of the nozzle, the distance between the nozzle and the substrate, and the impact velocity of the droplets onto the substrate are controlled such that the cell sample is dispersed uniformly on the substrate with a substantially discrete arrangement of chromosomes of the cell sample to provide for accurate and efficient karyotyping preparation and/or analysis. Any of the embodiments disclosed, taught or suggested herein may be combined in any suitable fashion or manner to achieve one or more of the desired objectives as taught herein, without any limitation(s).

In one embodiment, the printing involves matrix printing of the cell sample.

In one embodiment, the method further comprises staining the cell sample and/or chromosomes.

In one embodiment, the method further comprises a microscopic or imaging analysis of the cell sample and/or chromosomes.

In one embodiment, the method is an automated method controlled by a controller.

In one embodiment, the spreading of the cell sample and/or chromosomes is controlled by adjusting the number, spacing and volume, and forward velocity of the droplets applied to the substrate.

In one embodiment, the method further comprises adjusting a print area of the cell sample on the substrate such that its length is in the range from about 1 mm to about 75 mm.

In one embodiment, the method further comprises adjusting a print area of the cell sample on the substrate such that its width is in the range from about 1 mm to about 25 mm.

In one embodiment, the method further comprises precision definition of a printed area on the substrate to allow for more than one sample application to a single substrate In one embodiment, the possible number of samples printed on the substrate can range from 1 to about 100 or more.

In one embodiment, the substrate is selected from the group consisting of a glass slide, nitrocellulose membrane, a plastic membrane, a nylon membrane, or a nylon membrane on a continuous roll.

In one embodiment, the substrate comprises a surface modifier to improve the quality of cell spreading and cell adhesion.

In one embodiment, the surface modifier is selected from a group consisting of poly-L-lysine, amines, streptavidin, epoxy, metal film, and dielectric materials.

In one embodiment, the substrate on which the cells are dispensed comprises a barcode.

In one embodiment, the substrate on which the cells are dispensed comprises a hydrophobic layer.

In one embodiment, the hydrophobic layer further defines a printed area which is adapted to further mechanically separate multiple cells on the substrate.

In one embodiment, during dispensing the nozzle is arranged substantially perpendicularly to the substrate.

In one embodiment, the dispensing comprises line mode dispensing in which droplets of a predetermined size are dispensed onto the substrate by the nozzle to generate a line of individual spots with a specific spacing and volume, and/or spot size.

In one embodiment, the momentum transfer to the dispensed cells from the moving nozzle creates a cell rolling effect on the substrate and improves cell spreading and/or chromosome dispersion.

In one embodiment, the substrate is substantially parallel to a work platform on which it is positioned or substantially perpendicular to a long axis of the nozzle.

In one embodiment, the nozzle is part of a print head, and wherein the speed of the print head can be adjusted from about 5 mm/sec to about 150 mm/sec in order to increase or decrease the amount of forward momentum applied to the cells as they impact the substrate.

In one embodiment, a syringe pump is used to provide cells to the nozzle, and wherein the speed of the syringe pump can be adjusted from about 1 µL/sec to about 100 µL/sec in order to increase the velocity of the droplets in flight and/or to affect the forward momentum applied to the cells as they impact the substrate.

In one embodiment, the droplet volume can be adjusted from about 100 nl to about 4 µL in order to increase or decrease the amount of forward momentum applied to the cells as they impact the substrate.

In one embodiment, the cell spot spacing on the substrate can be adjusted from about 0.1 mm to about 10 mm between spots.

In one embodiment, the number of lines or rows of cells per substrate can be adjusted from 1 to about 200.

In one embodiment, the number of droplets per line can be adjusted from about 5 to about 200.

In one embodiment, prior to dispensing a matrix of cells on the substrate the dispenser mixes the cells in a source reservoir so that there is a substantially homogeneous mixture of cells in a dispense tip of the nozzle.

In one embodiment, the chromosomes of the cell sample are distinctly identifiable on the substrate.

In one embodiment, the arrangement of chromosomes of the cell sample on the substrate is configured for optimized staining.

In one embodiment, the arrangement of chromosomes of the cell sample on the substrate is configured for optimized microscopic or imaging analysis.

In accordance with certain embodiments, a method for matrix printing of cell samples for karyotyping is provided. The method involves dispensing droplets from a moving nozzle onto a surface. The dispensing comprises on-the-fly dispensing of cells on the surface. The speed of the nozzle is adjusted such that the forward momentum applied to the cells when they are dispensed onto the surface is such as to accurately spread the cells on the surface in preparation for karyotyping analysis.

In one embodiment, the surface is part of a substrate.

In one embodiment, the substrate comprises a glass slide.

In one embodiment, the substrate comprises a nylon membrane, a plastic membrane or a nitrocellulose membrane.

In one embodiment, the dispensing comprises line mode dispensing in which small droplets are dispensed onto the surface by the nozzle to generate a line of individual droplets with a specific spacing and volume.

In one embodiment, the momentum transfer to the dispensed cells from the moving nozzle creates a cell rolling effect on the surface and improves cell spreading.

In one embodiment, the surface is substantially parallel to a work platform on which it is positioned or substantially perpendicular to a long axis of the nozzle.

In one embodiment, the nozzle is part of a print head, and wherein the speed of the print head can be adjusted from about 5 mm/sec to about 150 mm/sec in order to increase or decrease the amount of forward momentum applied to the cells as they impact the slide.

In one embodiment, a syringe pump is used to provide cells to the nozzle, and wherein the speed of the syringe pump can be adjusted from about 1 µL/sec to about 100 µL/sec in order to increase the velocity of the droplets in flight and/or to affect the forward momentum applied to the cells as they impact the surface.

In one embodiment, the droplet volume of can be adjusted from about 100 nl to about 4 µL in order to increase or decrease the amount of forward momentum applied to the cells as they impact the slide.

In one embodiment, the cell spot spacing on the surface can be adjusted from about 0.1 mm to about 10 mm between spots.

In one embodiment, the number of lines or rows of cells per slide can be adjusted from 1 to about 200.

In one embodiment, the number of droplets per line can be adjusted from about 5 to about 200.

In one embodiment, wherein prior to dispensing the matrix of cells on the surface the dispenser mixes the cells in a source reservoir so that there is a substantially homogeneous mixture of cells in a dispense tip of the nozzle.

For purposes of summarizing the invention, certain aspects, advantages and novel features of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which.

DETAILED DESCRIPTION

Figure 1A:
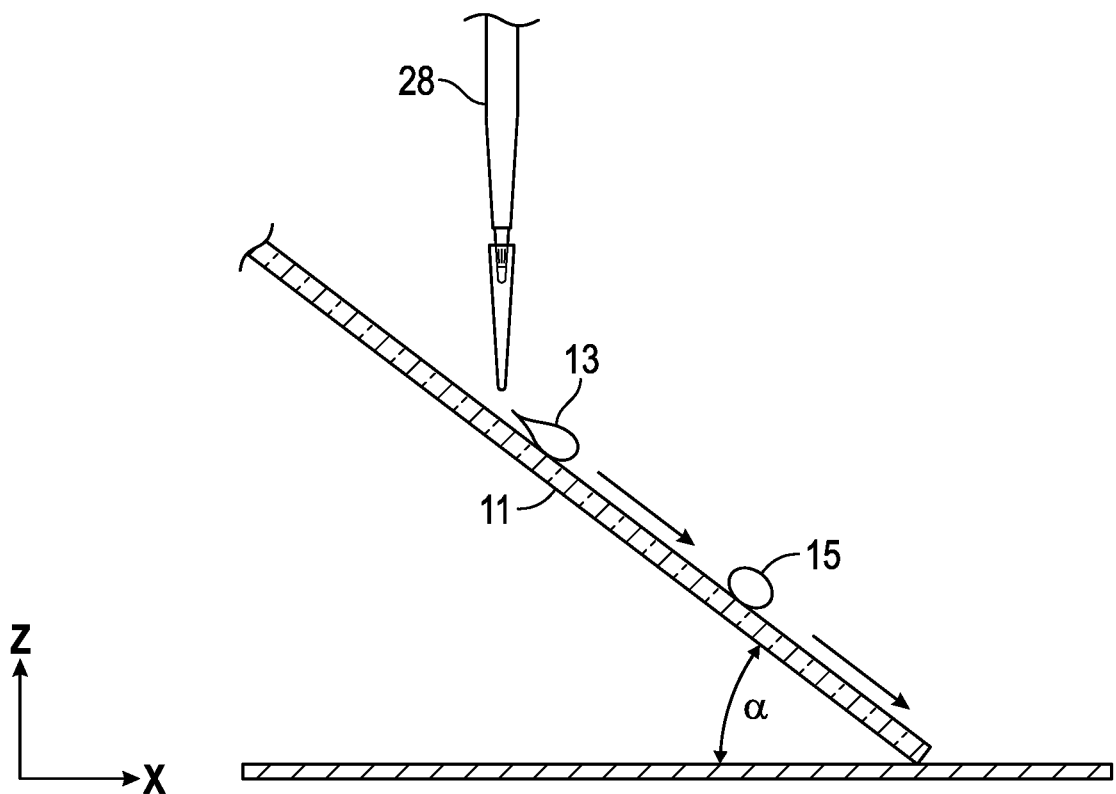
FIG. 1A is a simplified schematic representation of a conventional manual dispensing pipette which utilizes an angled slide for karyotyping.
Figure 1B:
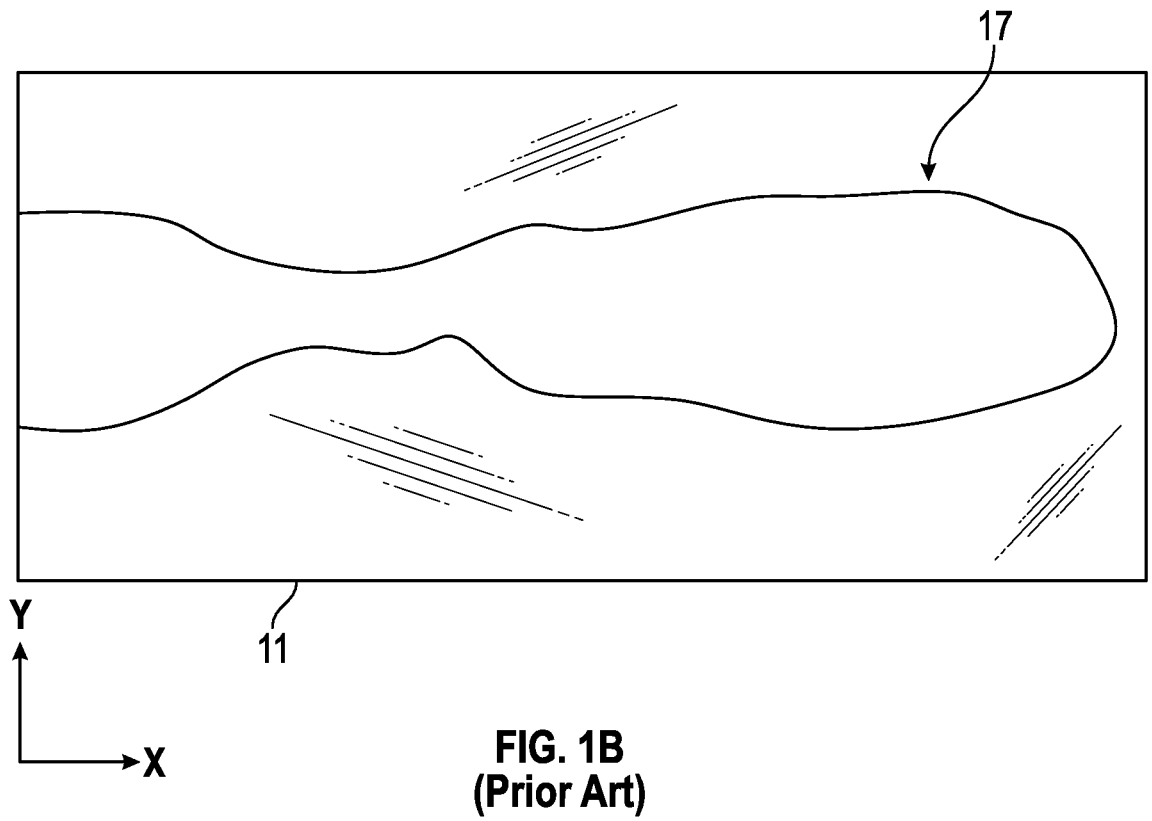
FIG. 1B is a simplified schematic top view of the undesirable and uneven dispersion of a cell sample onto the slide for karyotyping using the conventional methodology of FIG. 1A.
Figure 1C:
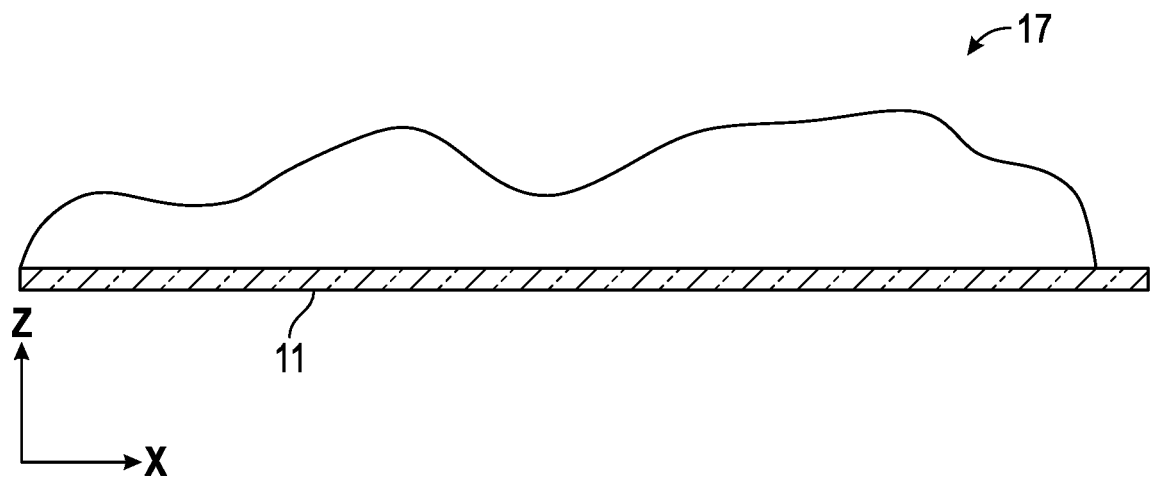
FIG. 1C is a simplified schematic side view of the undesirable and uneven dispersion of a cell sample onto the slide for karyotyping using the conventional methodology of FIG. 1A.
Figure 1D:
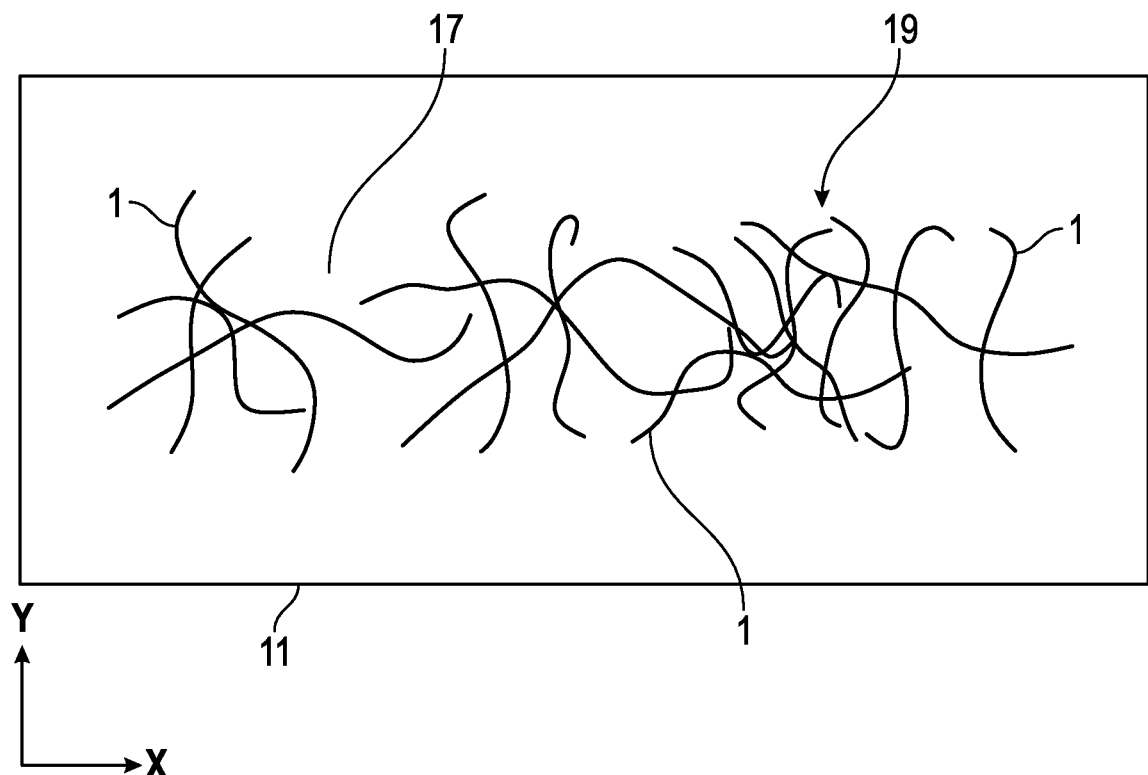
FIG. 1D is a simplified schematic top view of the undesirable meshwork and unevenness in the spreading and/or dispersion of chromosomes in the cell sample onto the slide for karyotyping using the conventional methodology of FIG. 1A.

The preferred embodiments of the invention described herein relate generally to matrix printing of one or more cell samples for karyotyping and, in particular, to methods and systems for matrix printing of at least one cell sample using on-the-fly printing or dispensing to accurately spread cells on a surface in preparation for karyotyping preparation, and further analysis.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

Certain embodiments provide methods and techniques for controlled printing of a cell sample for karyotyping. The methods can involve matrix printing using on-the-fly printing or dispensing to accurately spread cells within at least one cell sample on a surface in preparation for karyotyping, and further analysis. Advantageously, the methods result in a uniform distribution of chromosomes of the cell suspension or sample on the surface of a substrate which can be substantially discretely identified, and also provide for efficiency in a subsequent staining process and any further analysis of the stained chromosomes using a microscope or other imaging device.

Some embodiments provide for an automated method of dispensing cells for karyotyping without requiring an angled slide as used in conventional manual techniques which undesirably lack accuracy, reproducibility and efficiency. In order to dispense onto substrates, such as slides, that are not at a prescribed angle but rather at an angle of about 90 degrees relative to a system dispense nozzle, "line mode" technology is used to dispense cells. Line mode is generally directed to a method of dispensing in which small droplets are dispensed onto a surface by a printing nozzle to generate a line of individual droplets with a specific spacing and volume. The droplets, in some embodiments, overlay to form a continuous line or may in some particular cases be spaced to form a line of discrete drops. Using integrated communication between an X-Y- and/or Z robot and a printing nozzle, the printing instrument can deliver droplets onto a substrate, such as a microscope slide, without stopping the motion of the print head as it moves in one, or a particular predetermined, direction. Advantageously, this "continuous dispense" also provides forward momentum to the cells as they are dispensed and come in contact with the substrate, such as the microscope slide. The speed of the print nozzle can be used to adjust the forward momentum applied to the cells when they are dispensed onto the substrate or slide.

Some systems, methods and techniques for dispensing droplets in an on-the-fly manner, in accordance with certain embodiments of the invention, are disclosed in U.S. Pat. No. 6,063,339 to Tisone et al. and U.S. Pat. No. 7,754,439 B2 to Moore et al., the entirety of each one of which is hereby incorporated by reference herein. Some dispensing systems, in accordance with certain embodiments of the invention, are available from BioDot, Inc. of Irvine, Calif., U.S.A. as can be found on the www.biodot.com website, without limitation.

Those skilled in the art will recognize that other types of dispensers and associated actuation devices exist and may be used with efficacy. These may include, for example, but are not limited to piezoelectric dispensers, fluid impulse dispensers, heat actuated dispensers, air brush dispensers, and the like, as desired or required. Some systems, methods and techniques for dispensing droplets in an on-the-fly manner, in accordance with certain embodiments of the invention, are disclosed in U.S. Patent Application Publication No. 2008/0227663 A1 to Tisone et al., the entirety of which is hereby incorporated by reference herein.

Some embodiments of the disclosed karyotyping automated methods can provide for the following benefits in versatility, speed and efficiency of system performance: individual droplet size between about 100 nanoliters (nl) to about 4 microliters (µL) drops; spacing between droplets/spots between about 0.1 mm to about 10 mm; number of droplets per line from about 5 to about 200; number of lines per slide from 1 to about 20; spacing between lines can be overlapping, in some embodiments, and in other particular cases not so; print nozzle speed while printing can vary from about 5 mm/sec to about 150 mm/sec; and the drop velocity can be controlled, using for example the syringe speed in some embodiments when a syringe pump is part of the dispensing system, to increase effective steady state pressure.

The above parameters can also be efficaciously adjusted by utilizing a specific, predetermined and/or customized user interface in order to generate, for example, the spacing required for different cell sample types. Different cell types and different cell preparation techniques can produce metaphase cells with different characteristics, including the length of the chromosomes within metaphase cells.

The substrates on which the matrices are printed can comprise glass or microscope slides. In other embodiments, the substrate can comprise nylon membranes, plastic membranes or nitrocellulose membranes, as needed or desired.

FIGS. 1A, 1B, 1C and 1D represent a conventional, typically manual, technique of spreading a cell sample on an angled glass slide 11 for karyotyping, which has many inherent faults and deficiencies. A manual pipette 28 or the like is used to dispense a volume 13 in the form of one or more droplets 15 onto the slide 11 which is angled by an angle α (alpha) which typically ranges between about 20° to about 60° degrees.

The cell sample 17 spreads on the slide in an extremely spatially non-uniform fashion so that substantial areas of the slide 11 are uncovered and the depth of the sample 17 on the slide 11 is extremely uneven. As a result, the chromosome arrangement 19 on the slide 11 is a meshwork of intertwined and non-discrete chromosomes 1 which complicates the preparation of the cell sample 17 for karyotyping and further analysis. This is most disadvantageous for carrying on a proper karyotyping analysis.

Turning back to the background and bio-chemistry involved in karyotyping, if cellular genetic structure or makeup has been altered (duplicated, deleted, or moves from one chromosome to another chromosome), it can often be detected by performing a karyotype analysis (also known as karyotyping or G-banding) the specimen. In order for a scientist to properly analyze a specimen's genome by 'karyotyping', entire chromosome structures are reviewed and compared to known normal structures. When chromosomes are stained with, for example, Geimsa stain, each chromosome creates a unique banding pattern based on the presence and sequence of genes that are known to exist on that chromosome. Changes in a specimen's genome can be detected if the known banding pattern has been changed from the predictable state.

While karyotyping may be a well-established technique that has been used for many years to analyze genetic information, it is important that a scientist is able to view each chromosome independently. Chromosomes tend to be long, string-like structures and each chromosome (a human cell contains 46 unique chromosomes) is held within the cell's nucleus.

Figure 1E:
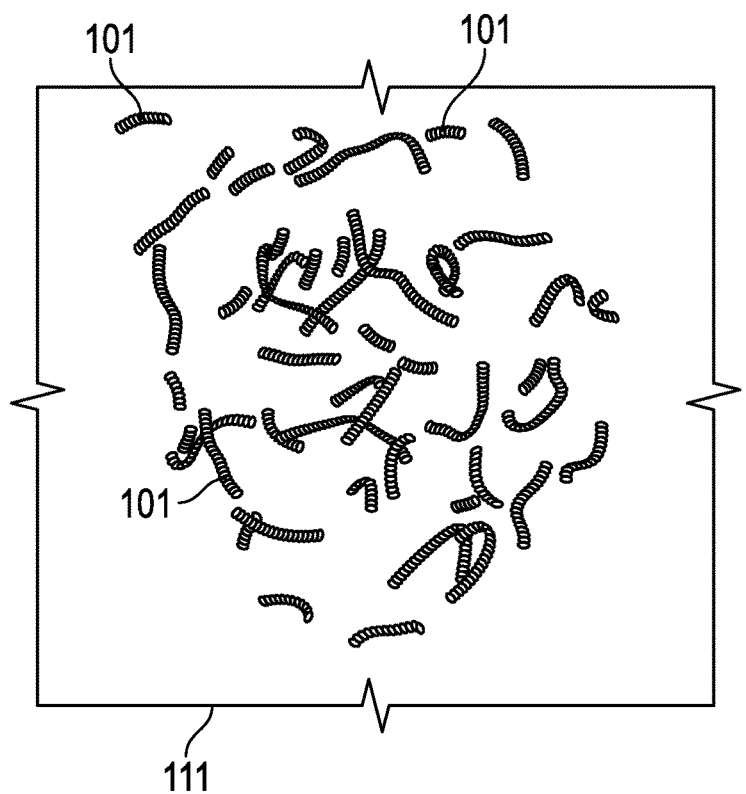
FIG. 1E is an exemplary blood sample nucleus imaged with a Metafer imaging system at 63× magnification, wherein the image depicts a substantially properly spread metaphase nucleus with chromosomes which do not overlap significantly and can be properly analyzed, in accordance with certain embodiments of the invention.

In order for a scientist to properly analyze a specimen's entire set of chromosomes during karyotyping, the nuclear content should spread until each individual chromosome (101 on substrate 111) can be distinguished entirely from the other chromosomes within the cell. Such a situation is illustrated in FIG. 1E which is accordance with what at least some embodiments of disclosed herein.

Figure 1F:
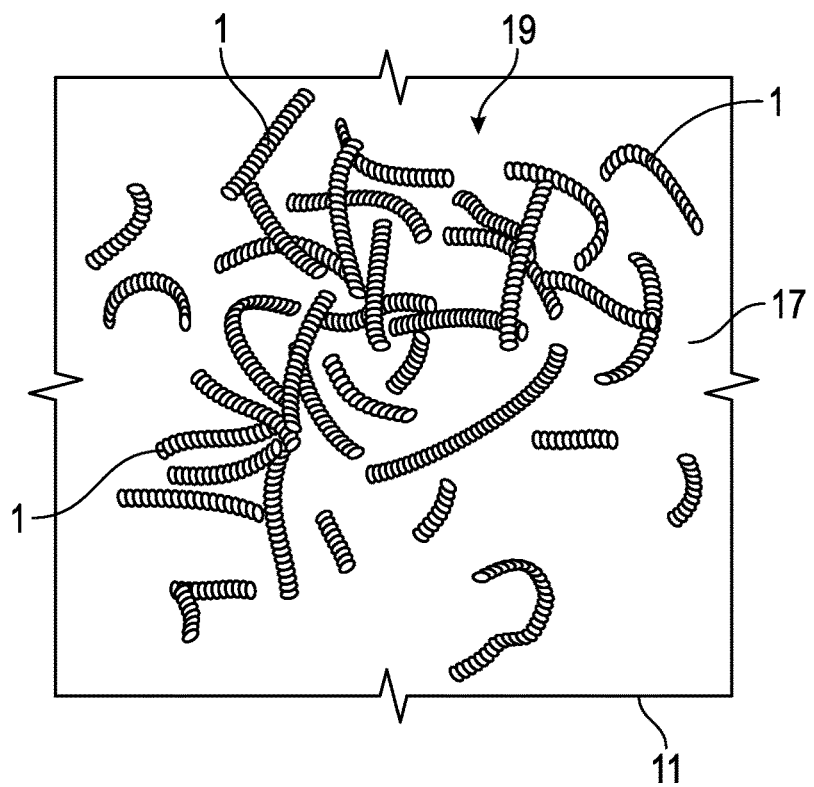
FIG. 1F is an exemplary blood sample nucleus imaged with a Metafer imaging system at 10× magnification in which the image depicts a poorly spread metaphase nucleus, wherein due to the lack of spreading, the chromosomes overlap considerably, and cannot be distinguished from one another, therefore compromising results, and highlighting the problems in karyotyping associated with conventional methods.
Figure 1G:
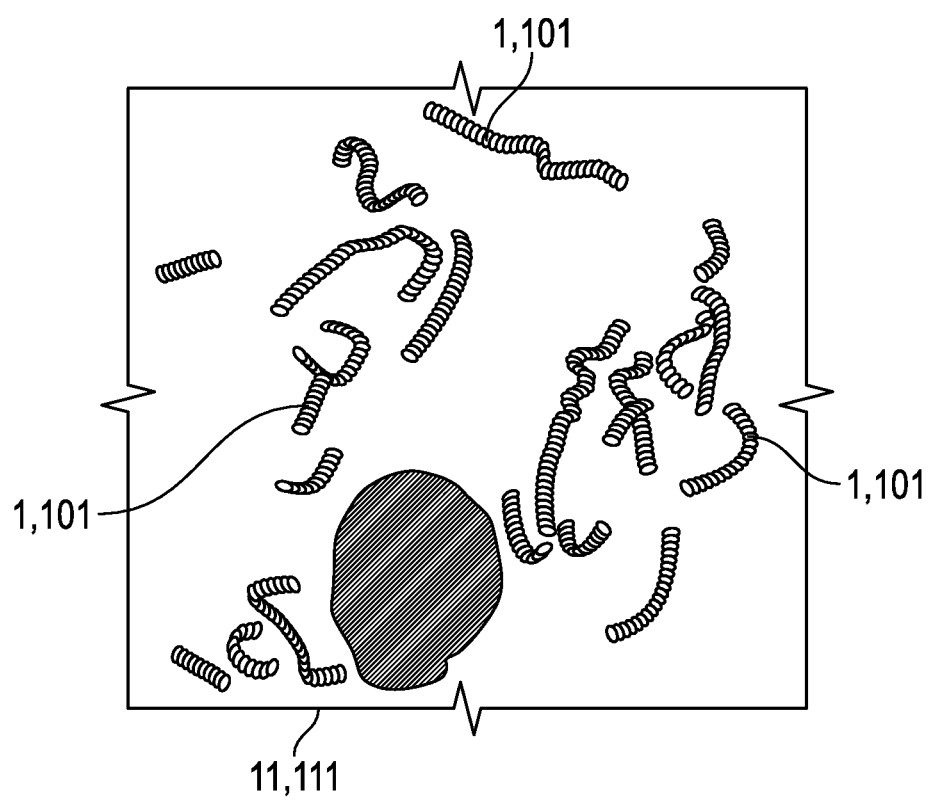
FIG. 1G is a blood sample nucleus imaged with a Metafer imaging system at 63× magnification which depicts an image of an overly spread metaphase nucleus, wherein some of the chromosomes from this nucleus (the full set contains 46 chromosomes) have spread outside the field of view of the microscope or imaging device since the chromosomes that are not present in the image have spread to an adjacent cell and this compromises the results and proper analysis in karyotyping associated with conventional methods.

Poorly or improperly spread specimens display a tangled and overlap group of chromosomes (see FIG. 1F). If these banding patterns are overlapped when viewed by a scientist, it will compromise the results of the karyotype, as is common in conventional karyotyping techniques utilized in the art. FIG. 1G illustrates certain microscopic or image analysis problems as associated with conventional karyotyping methodologies.

By way of further background, the typical manual karyotyping techniques include the application of a droplet (of cell solution) onto a slide in an environment in which the temperature and relative humidity are controlled. The technicians typically angle the slide and apply the droplet to the highest point on the slide in such a way that the droplet cascades down the slide as the cells dry and adhere to the slide surface. This forward movement imparts forward velocity to the cells in suspension as they move on the slide. The forward movement has been referred to as 'cell rolling' and is highly regarded as a critical aspect of the cell dropping technique. Cell rolling is thought to help the uniform spreading from cell to cell and chromosome to chromosome (within a given cell or nucleus).

While a slide angle is required in order to induce 'cell rolling', it is inherently variable since technicians typically do not measure the angle or ensure the proper angle is achieved in normal practice. Greater angles typically will increase 'cell rolling' and smaller angles will decrease 'cell rolling'. Embodiments of the invention as disclosed, taught or suggested herein advantageously and consistently provide a forward velocity and spreading on the substrate or slide which is extremely much more precise and consistent for karyotyping preparation and/or subsequent further analysis.

Also, in accordance with some embodiments, by generating the cell rolling effect on a flat substrate or slide, a significantly more practical means of automating the process has been developed since dispensing onto an angled surface adds significant complication.

Advantageously, on-the-fly dispensing of cellular samples for karyotyping and/or cytogenetic analysis creates an automated means of properly and precisely spreading chromosomes on a substrate or glass slide surface that does not require the need to angle the substrate or glass slide. On-the-fly dispensing, desirably, can do so by imparting forward velocity to cells as they are applied to the substrate or slide, thereby recreating the cell rolling phenomenon that is one important aspect of the cell spreading protocol.

Some Exemplary on-the-Fly Dispensing Devices

Figure 2:
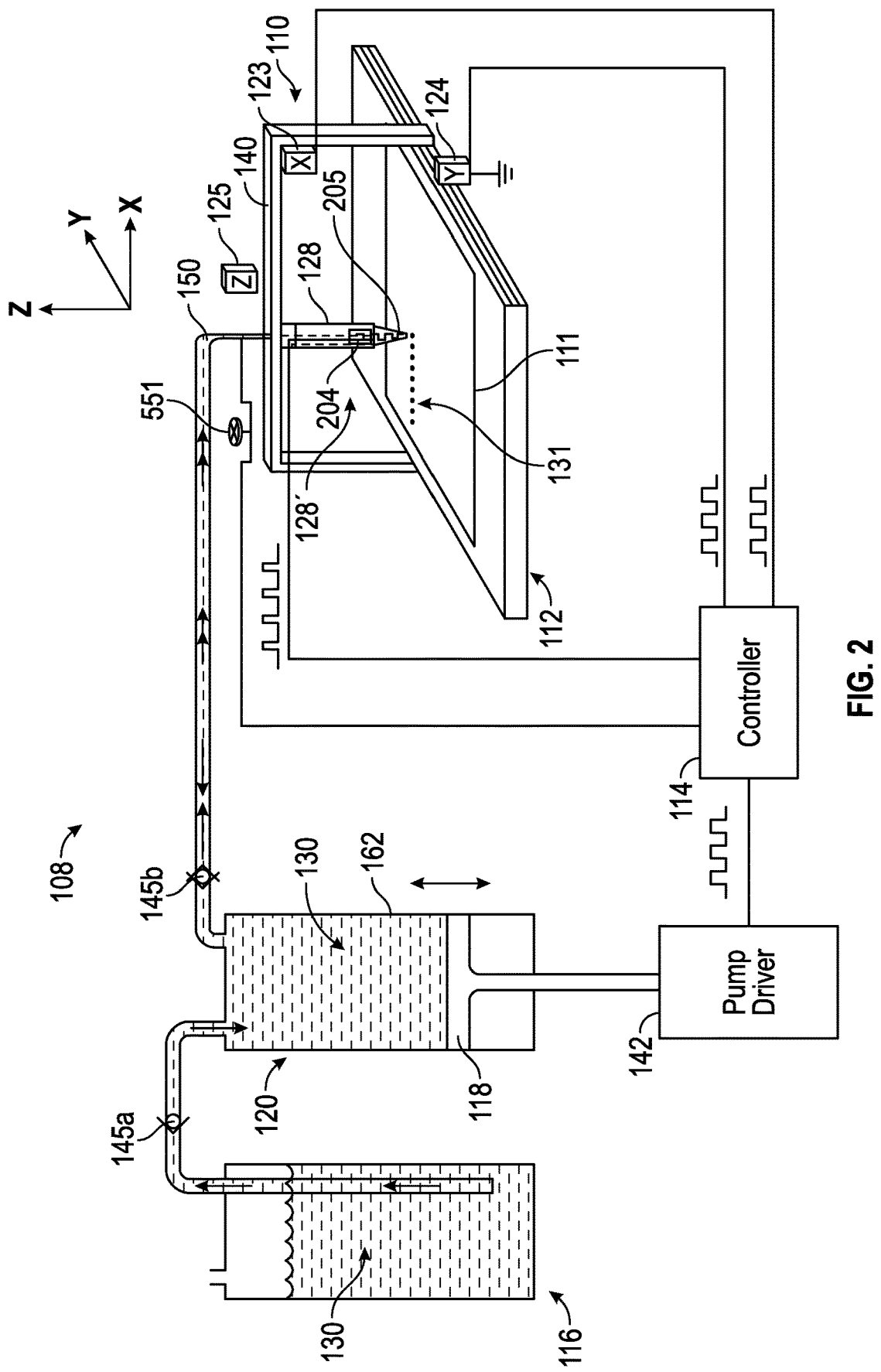
FIG. 2 is a simplified view of an on-the-fly dispensing system illustrating features and advantages in accordance with certain embodiments of the methods of the invention.

FIG. 2 is a simplified depiction of an on-the-fly dispensing system or apparatus 108 for utilization in accordance with certain embodiments of the karyotyping methods taught herein. The dispensing system or apparatus 108 is particularly adapted for automated high-speed precision dispensing (and aspirating) of liquids such as cell samples for karyotyping.

The dispensing system or apparatus 108 generally comprises a dispense or dispensing head 128' with one or more dispensers 128 having a valve or other dispensing means 204 operated by an actuator, such as a solenoid. The dispenser 128 is hydraulically coupled or in fluid communication with a positive displacement pump 120 for metering precise quantities of fluid or liquid 130 (such as a cell sample) to or towards the dispenser 128. The dispenser 128 can be mounted on or in association with an X-Y- and/or Z table, gantry or robotic movement system 110 to provide for on-the-fly dispensing of droplets.

A substrate or target 111 can be mounted on a carrier platform, table or carriage 112 to receive reagent, liquid or a cell sample dispensed from the dispenser 128. The substrate 111 can comprise a glass slide or receptive membrane, among others, as required or desired.

Those skilled in the art will appreciate that the motion system may include one or more position stepper motors 123, 124, 125 or the like, which are operable to move either the dispenser 128 and/or the carrier platform or table 112 relative to one another in the X, X-Y or X-Y-Z directions, as indicated in the drawing. Alternatively, or in addition, one or more suitable robot arms may be efficaciously used, as needed or desired, to provide controlled relative motion between the dispenser 128 and the target substrate 111 and/or other components or associated components of the apparatus 108. For on-the-fly dispensing, in certain embodiments, the motion system moves the dispense head in at least the X and Z directions to accurately spread the cell sample onto the substrate 111 for karyotyping.

Though FIG. 2 shows only a single dispenser 128, in other embodiments, it is contemplated that multiple dispensers in linear (1×N) or two-dimensional (M×N) arrays are used. These may be provided and operated either in parallel or in another coordinated fashion, as desired. It should be understood that any discussion herein with specific reference to the single dispenser embodiment is substantially equally applicable, with possible modifications as apparent to the skilled artisan, to multiple dispensers each connected to respective pumps or a single pump.

The positive displacement pump 120 can comprise a syringe pump though other direct current (DC) fluid sources may be used with efficacy. The syringe pump 120 can be hydraulically coupled to or in fluid communication with a fluid reservoir 116 through a first one-way check valve or open-close valve 145a. The syringe pump 120 can draw fluid 130 (such as a cell sample for karyotyping) from the fluid reservoir 116 and provide it to the dispenser 128 through a second check valve or open-close valve 145b on a supply line or feedline 150.

The syringe pump 120 can have a movable piston 118 within a syringe barrel 162. The syringe pump 120 is operated by a syringe pump driver 142 comprising, for example, a stepper motor and an associated lead screw, for extending and retracting the piston 118 within the syringe barrel 162. Those skilled in the art will readily appreciate that when the piston 118 is retracted, fluid 130 is drawn from the reservoir 116 into the syringe pump 120. When the piston 118 is again extended, fluid 130 is forced to flow from the syringe barrel 162 into the dispenser 128 via the supply tube 150, whereupon it is ejected by the dispenser 128 onto or into the target substrate 111 in the form of droplets 531, or in some cases as a spray pattern.

In one embodiment, the fluid or liquid 130 comprises the cell sample that is dispensed onto or into the target 111. That is the system is filled with the liquid (or cell sample) 130 to be dispensed. This set-up can be particularly advantageous when relatively large quantities of the same cell sample are to be dispensed.

In another embodiment, the fluid or liquid 130 comprises a system fluid or backing reagent, such as distilled water, and the dispensing apparatus 108 operates in a "suck-and-spit" mode. In this embodiment, the dispenser 128 is used to aspirate a predetermined amount of fluid, liquid or reagent (such as a cell sample for karyotyping) from a source receptacle or microtiter plate and the like and then dispense the aspirated liquid onto or into the target 111. As the skilled artisan will appreciate, liquid is aspirated by retracting or decrementing the pump piston 118 with the valve 145b open to create a reduced pressure or partial vacuum to draw source reagent (such as the cell sample) into the dispenser 128 via a suitable tip or nozzle thereon.

A controller 114 oversees operation of the pump 120, X-Y- and/or Z relative motion and the dispenser 128, among other associated components. The controller 114 coordinates and controls the motion of each of the stepper motors 123, 124, and the syringe pump driver 142, as well as the opening and closing of the dispensing valve 204 to precisely dispense an amount of reagent or cell sample at one or more predetermined location(s) on target substrate 111. The controller 114 also controls and coordinates aspiration of source reagent or cell sample(s), as and if needed.

A computer software program can be interfaced with the controller 114 guide dispensing (and/or aspirating) for different modes of operation and different applications. A user-defined text file can be created, for example, from a spreadsheet of values or template, with lists of numbers of user-defined dispense volumes of one or more reagents or cell sample(s) and corresponding coordinates of the dispense (and/or aspirate) operation. The controller 114 uses this text file data in cooperation with the software program to precisely control and coordinate the operation of the dispensing apparatus 108.

Advantageously, the use of such a text file control allows high-speed on-the-fly precision dispensing to print arrays onto or into multiple predetermined locations of a desired target or substrate. This can be particularly advantageous when more than one dispenser, dispense head or manifold system or a combination thereof is utilized to facilitate process efficiency. These multiple dispensers can be operated in parallel or in synchronous coordination. In some embodiments, one or more pressure sensors 551 are provided to monitor the system pressure and provide diagnostic information about various fluid and flow parameters within the hydraulic system.

Figure 3:
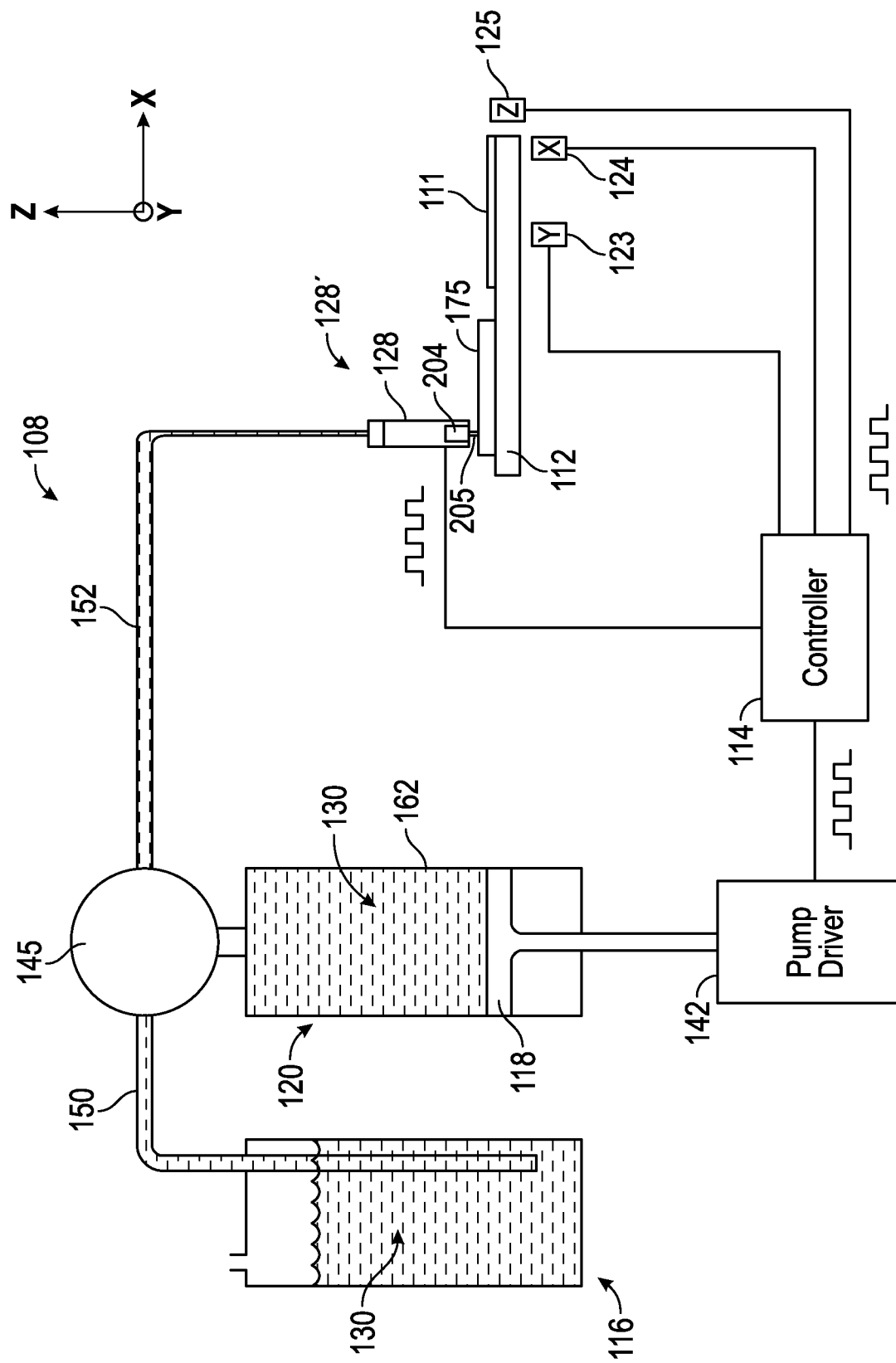
FIG. 3 is a simplified view of another exemplary on-the-fly dispensing system illustrating features and advantages in accordance with certain embodiments of the methods of the invention.

FIG. 3 is another simplified representation of an on-the-fly dispensing system or apparatus 108 for use in accordance with certain embodiments of the karyotyping methods taught herein. The dispensing system or apparatus 108 is particularly adapted for automated high-speed precision dispensing (and aspirating) of liquids such as cell samples for karyotyping. Like reference numerals in FIG. 3 correspond to like elements in as illustrated in at least FIG. 2.

Referring in particular to the system of FIG. 3, the dispensing apparatus 108 generally comprises a dispense or dispensing head 128' having one more or dispensers 128 having a valve or other dispensing means 204 operated by an actuator, such as, for example, a solenoid that dispenses drops onto a substrate 111 in a non-contact manner. The dispenser 128 is hydraulically coupled to or in fluid communication with a positive displacement pump 120 for metering precise quantities of fluid or liquid 130 (such as cell sample for karyotyping) to or towards the dispenser 128. The dispensing head 128' and the dispenser(s) 128 are mounted on or in association with a platform 112.

The term "X-Y-Z" as used herein refers to a system that is capable of moving in the X, Y, and/or Z directions in any combination. The X-Y-Z system may include one or more position stepper motors 123, 124, 125 or the like, which are operable to move either the dispensing head 128'(and/or the dispenser(s) 128) and/or the platform 112 relative to one another in the X, X-Y, or X-Y-Z directions. It bears noting also that while this description may refer only to a single dispensing head 128', it is contemplated that multiple dispensing heads in linear (1×N) or two-dimensional arrays (M×N) can also be used with equal or improved efficacy. Such multiple dispensing heads may be operated in parallel, i.e., for multi-gang operation, or in another coordinated fashion, as desired.

One or more substrates 111 may be mounted on the platform 112 to receive cell sample(s) dispensed from the dispenser(s) 128. Additionally, a source reservoir 175 may be provided from which cell sample(s) may be aspirated by the dispense head 128' or dispenser(s) 128 and dispensed onto the substrate 111. It should be understood that while a single source reservoir 175 and a single substrate 111 are depicted in FIG. 3, multiple sources and multiple substrates may be provided and/or mounted or arranged on the platform 112, as desired or required. Frequently, the source reservoir 175 will be any suitable reservoir that temporarily stores reagents to be dispensed onto the substrate 111 by the dispenser 128. Similarly, it should be understood that the term "reagent" as used herein refers to cell suspensions or test reagents that will be dispensed by the dispenser 128 onto the substrate 111.

The substrate 111 may comprise any suitable surface upon which a cell array may be formed and a diagnostic assay may be conducted, such as karyotyping. Exemplary substrates include, but are not limited to, nylon membranes, plastic membranes, nitrocellulose membranes, and glass slides. In certain embodiments, the substrate 111 may comprise a membrane, such as nylon, that is fed from a continuous roll.

The positive displacement pump 120 can comprise a syringe pump, although other direct current fluid sources may be used. The syringe pump 120 is hydraulically coupled to or in fluid communication with a fluid reservoir 116 through a first supply line 150 and a switching valve 145. The syringe pump 120 draws fluid 130 from the fluid reservoir 116 and provides it to or toward the dispensing head 128' through a second supply line 152 also in communication with the switching valve 145.

The syringe pump 120 has a movable piston 118 within a syringe barrel 162. The syringe pump 120 is operated by a syringe pump driver 142 comprising, for example, a stepper motor and an associated lead screw, for extending and retracting the piston 118 within the syringe barrel 162. Those skilled in the art will readily appreciate that when the piston 118 is retracted, fluid 130 is drawn from the reservoir 116 through the switching valve 145 into the syringe pump 120. When the piston is again extended, fluid 130 is forced to flow from the syringe barrel 162 into the dispensing head 128' via the second supply tube 152, whereupon it is ejected by the dispensing head 128' onto the substrate 111 in the form of droplets.

In one embodiment, the fluid 130 comprises the reagent or cell sample that is dispensed onto the substrate 111. Thus, the reservoir 116, pump barrel 162, dispenser 128 and supply lines 150 and 152 are filled with the fluid 130 to be dispensed. This arrangement can be particularly advantageous when large quantities of the same reagent are to be dispensed onto the substrate 111. For example, it may be desirable to manufacture large number of substrates each having the same cell sample that is uniformly distributed for karyotyping processes.

In another embodiment, the fluid 130 comprises a backing reagent, such as distilled water, and the dispensing apparatus 108 operates in an aspirate/dispense mode. In this embodiment, the dispenser 128 is used to aspirate a predetermined amount of reagent from the source reservoir 175, movably transport the reagent relative to the substrate 111, meter the predetermined amount of the reagent, and dispense the aspirated reagent onto or into the substrate 111. Reagent is aspirated by retracting or decrementing the pump piston 118 with the switching valve 145 open to create a reduced pressure or partial vacuum along supply line 152 to draw reagent from the source reservoir 175 into the dispenser 128 via a suitable tip 205 or nozzle thereon. In certain embodiments, this same process can be repeated on a smaller scale to mix reagent, particularly cells that may have settled out of solution so as to provide a relatively homogenous cell suspension which then may be aspirated and subsequently dispensed onto the substrate 111. As will be appreciated, it may be necessary to repeat some or all of the steps in order to form the desired cell array and/or dispense the desired cell sample(s) in preparation for the diagnostic analysis, such as karyotyping, onto the cell array after it is formed.

A controller 114 can oversee operation of the syringe pump 120, X-Y-Z motion, platform 112, and the dispensing head 128'. Specifically, the controller 114 can coordinate and control the motion of each of the stepper motors 123, 124, 125 and the syringe pump driver 142, as well as the opening and closing of the dispensing valve 204 to precisely meter and dispense an amount of reagent at predetermined locations on the substrate 111 in an on-the-fly dispensing mode. As necessary, the controller 114 can also control and coordinate mixing and aspiration of reagent or cell sample from the source reservoir 175. A software program can be interfaced with the controller 114 to guide mixing, dispensing, and aspirating for different modes of operation and different applications. A user-defined text file is preferably generated, for example, from a spreadsheet of values or a template, with lists of numbers of user-defined dispense volumes for the cell sample(s) and corresponding coordinates of the mixing, aspirating, and dispensing operation. The controller 114 can use this text file data in cooperation with the software program to precisely control and coordinate the operation of the dispensing apparatus 108.

The dispensing system or apparatus 108 in certain embodiments operates in an "on-the-fly" mode, that is without stopping the motion of the dispense head 128' and/or the platform 112. To accommodate this on-the-fly dispensing without sacrificing accuracy, precision or repeatability, the controller 114 calculates a phase adjustment for each dispense cycle. The phase adjustment is such as to advance or retard the timing of the valve 204 opening and closing so that the dispensed droplet of reagent or cell sample lands at the desired location on the substrate 111 (or at a desired offset location), taking into account its anticipated trajectory.

Those skilled in the art will appreciate that the magnitude of the necessary or desired phase adjustment will depend, among other things, on a number of system input and output parameters and behavioral characteristics, including the desired drop offset (if any), the vertical distance between the dispensing head nozzle 205 and the surface of the substrate 111, the velocity and/or acceleration of the dispensing head 128' and/or the substrate 111 relative to one another, the velocity of the dispensed droplets, ambient temperature and humidity, and other controlled and/or uncontrolled factors. While certain of these parameters or characteristics can be isolated and studied such that their impact on the necessary phase adjustment is fairly predictable, other parameters or characteristics can in some cases not be isolated nor predicted. In such situations, if needed, precise phase adjustments can be determined experimentally for a given production set up either before or during production such that a high degree of accuracy, precision, and repeatability is attained during long production runs.

As will be appreciated by one of skill in the art, if the cell array is to be used for diagnosis based on karyotyping, the predetermined analyte can be one or more chromosomes that can be stained with a commercially available chromosome staining reagent. The imaging system used to analyze the cell arrays of may be a microscope or an automated machine capable of detecting a reaction between the involved reagents, such as chromosomes in a cell sample and a staining agent or probe.

In certain embodiments, and as also noted above, the dispensing system or apparatus 108 uses a controller 114 which generally comprises a host CPU or computer that interfaces with some form of data memory. In particular, the controller may be divided into five basic subsystems: host CPU, coordinate control circuitry, memory and logic circuitry, syringe stop count circuitry, and valve firing circuitry. Those of skill in the art will appreciate that each subsystem works in cooperation with the other subsystems to simultaneously control and coordinate the stepper motors 123, 124, 125, the syringe pump motor 142, and the valve dispenser 128 to precisely mix, aspirate, transport, meter, and dispense an amount of reagent or cell sample at predetermined locations on or in the substrate 111, to provide on-the-fly dispersion of cell sample spots on the substrate for karyotyping. The controller 114 may also coordinate and control wash/purge operations and refilling the dispensing apparatus with fluid from the fluid or cell suspension reservoir 116, as needed or desired.

In some embodiments, more fully disclosed in U.S. Patent Application Publication No. US 2002/0159919 A1 entitled METHOD AND APPARATUS FOR HIGH-SPEED MICROFLUIDIC DISPENSING USING TEXT FILE CONTROL, incorporated herein by reference, the dispensing apparatus 108 is equipped with the controller 114 that interfaces with a computer software program to guide dispensing and/or aspirating for different modes of operation of the system and different applications. The controller 114 uses text file data in cooperation with a software program to precisely control and coordinate the operation of the dispensing apparatus or system 108.

Chromosome Arrangement for Karyotyping and Analysis

Figure 4:
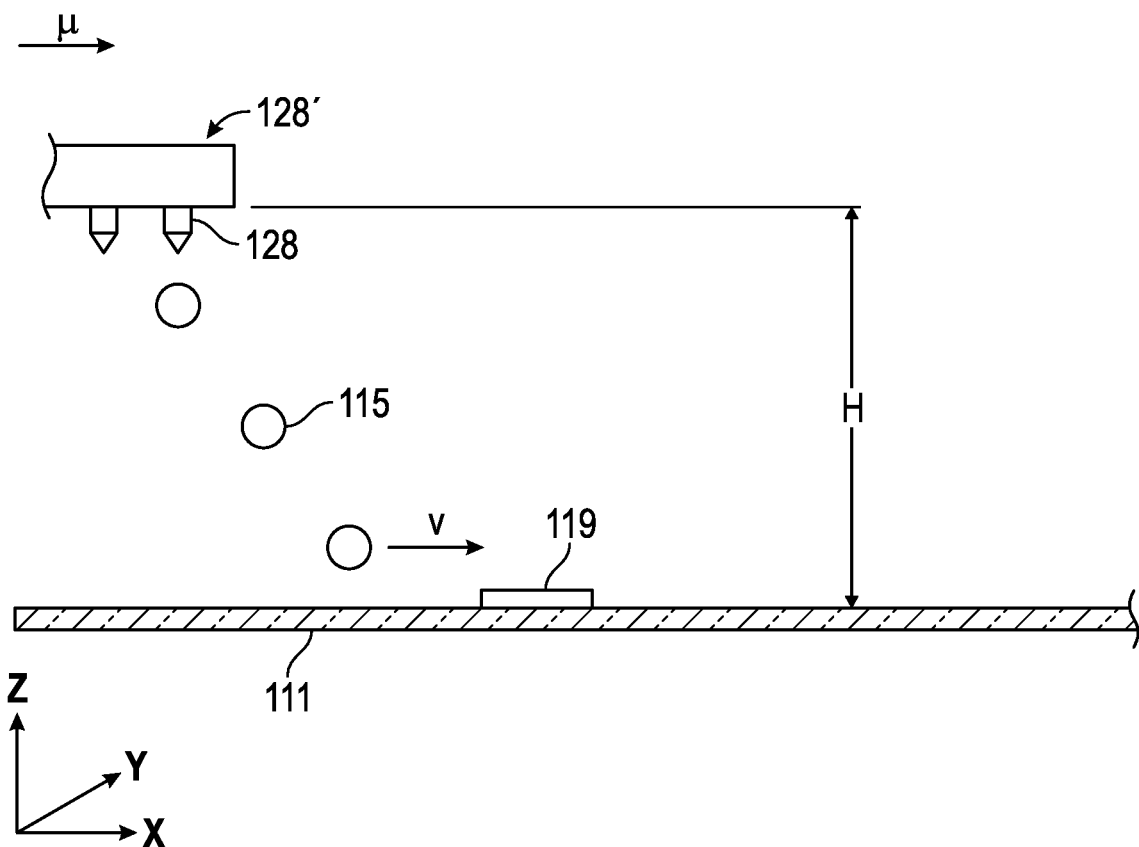
FIG. 4 is a simplified schematic view of an on-the-fly droplet dispensing technology, such as a moving dispense head, to accurately and uniformly disperse a cell sample spot on a substrate for karyotyping illustrating features and advantages in accordance with certain embodiments of the invention.

In accordance with certain embodiments, FIG. 4 is a simplified schematic view of an on-the-fly droplet dispensing technology, such as a moving dispense head 128' with one or more dispensers or dispense channels 128, to accurately and uniformly disperse a cell sample spot 119 on a substrate 111 for karyotyping. The dispense head 128' moves at a predetermined velocity "U" to dispense cell sample droplets 115 with a predetermined impact velocity "V" from a predetermined height "H" above the substrate 111 to form a cell sample spot 119 with a predetermined spreading area.

Figure 5:
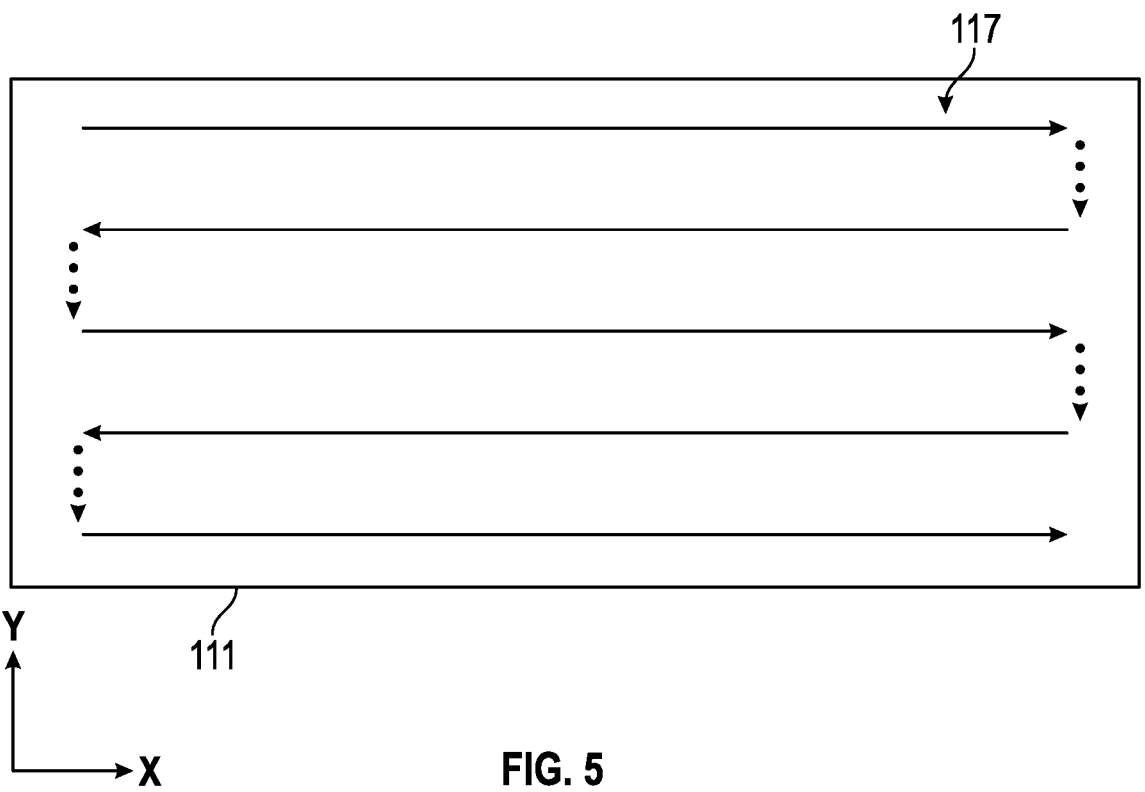
FIG. 5 is a simplified schematic top view of a line dispense pattern for accurately dispersing and spreading a cell sample on a substrate for karyotyping illustrating features and advantages in accordance with certain embodiments of the invention.

In accordance with certain embodiments, FIG. 5 is a simplified schematic top view of a line dispense pattern for accurately dispersing and spreading the cell sample arrangement 117 on the substrate 111 for karyotyping. In one embodiment, a preferred pattern of dispensing motion in relation to the substrate 111 advantageously decreases the time to complete a particular dispensing operation. Upon executing a first linear pass along a first row, the dispensing head 128' reverses direction and executes a second pass along an adjacent second row. Such bi-directional dispensing advantageously decreases the time required to complete a dispensing operation in comparison to a unidirectional dispensing operation. It is also envisioned that for non-sequential or intermittent dispensing the controller 114 would speed operation by dispatching the dispensing head 128' directly to or adjacent the next desired target location without necessarily completing each successive pass or each intervening row.

Figure 6:
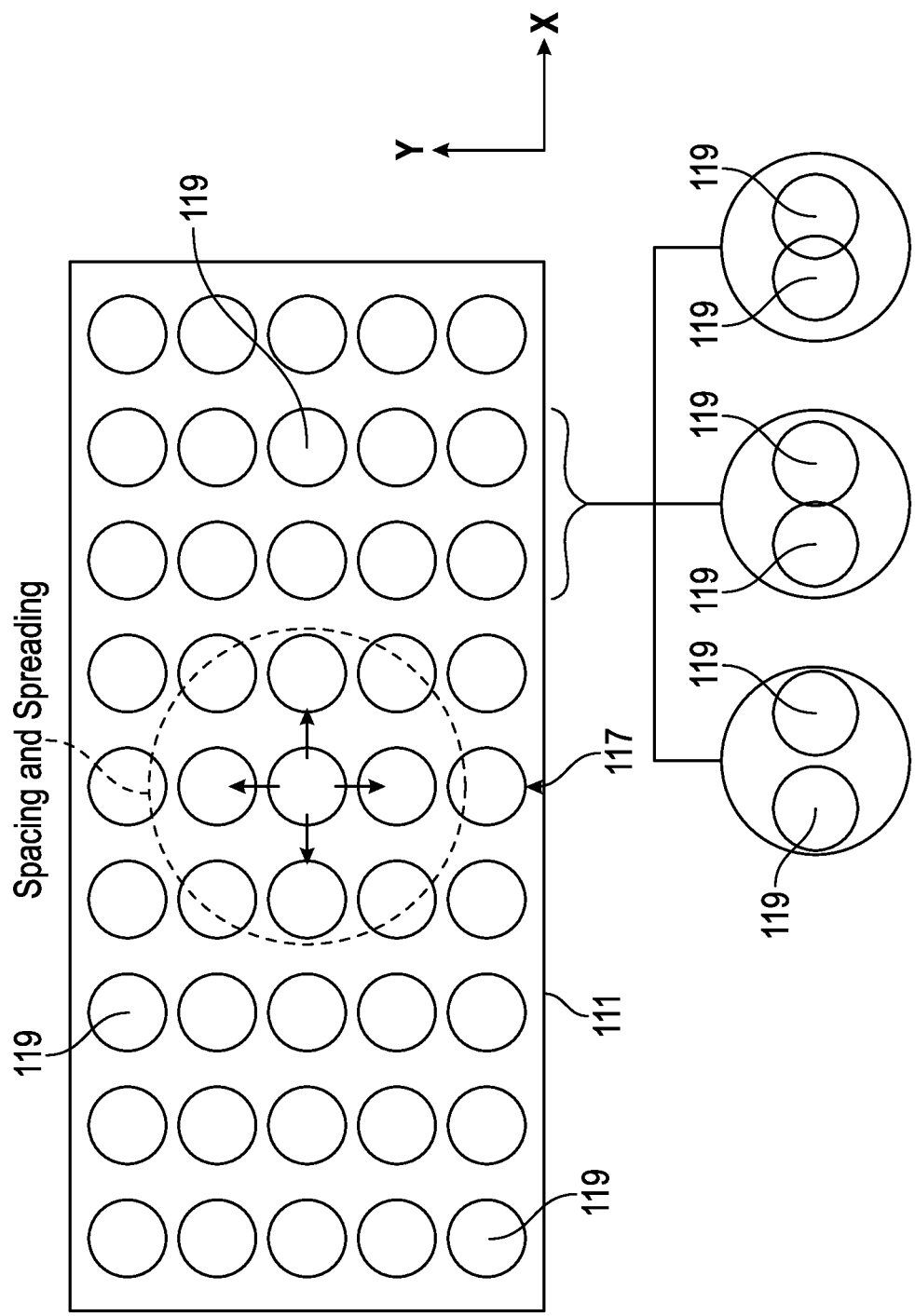
FIG. 6 is a simplified schematic top view of an adjustable spot spacing arrangement on a substrate prepared by an on-the-fly dispensing technique for karyotyping illustrating features and advantages in accordance with certain embodiments of the invention.

In accordance with certain embodiments, FIG. 6 is a simplified schematic top view of an adjustable spot spacing arrangement 117 on the substrate 111 prepared by an on-the-fly dispensing technique for karyotyping with cell sample spots 119. The spacing and spreading of the cell sample spots is adjustable to provide for the uniform, repeatable and accurate formation of the arrangement 117.

Figure 7:
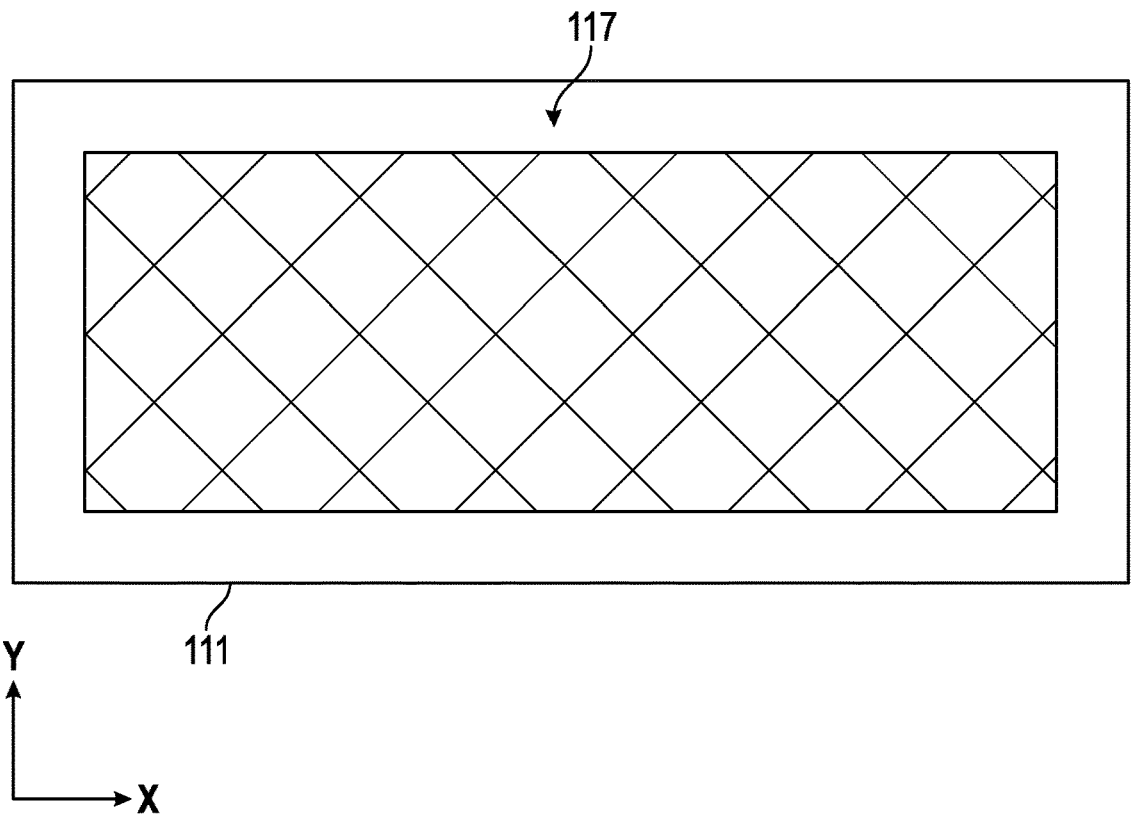
FIG. 7 is a simplified schematic top view of a uniformly arranged single cell sample on a substrate prepared by an on-the-fly dispensing technique for karyotyping illustrating features and advantages in accordance with certain embodiments of the invention.

In accordance with certain embodiments, FIG. 7 is a simplified schematic top view of a uniformly arranged single cell sample 117 on the substrate 111 prepared by an on-the-fly dispensing technique for karyotyping. Advantageously, this overcomes many of the deficiencies of related conventional karyotyping techniques.

Figure 8:
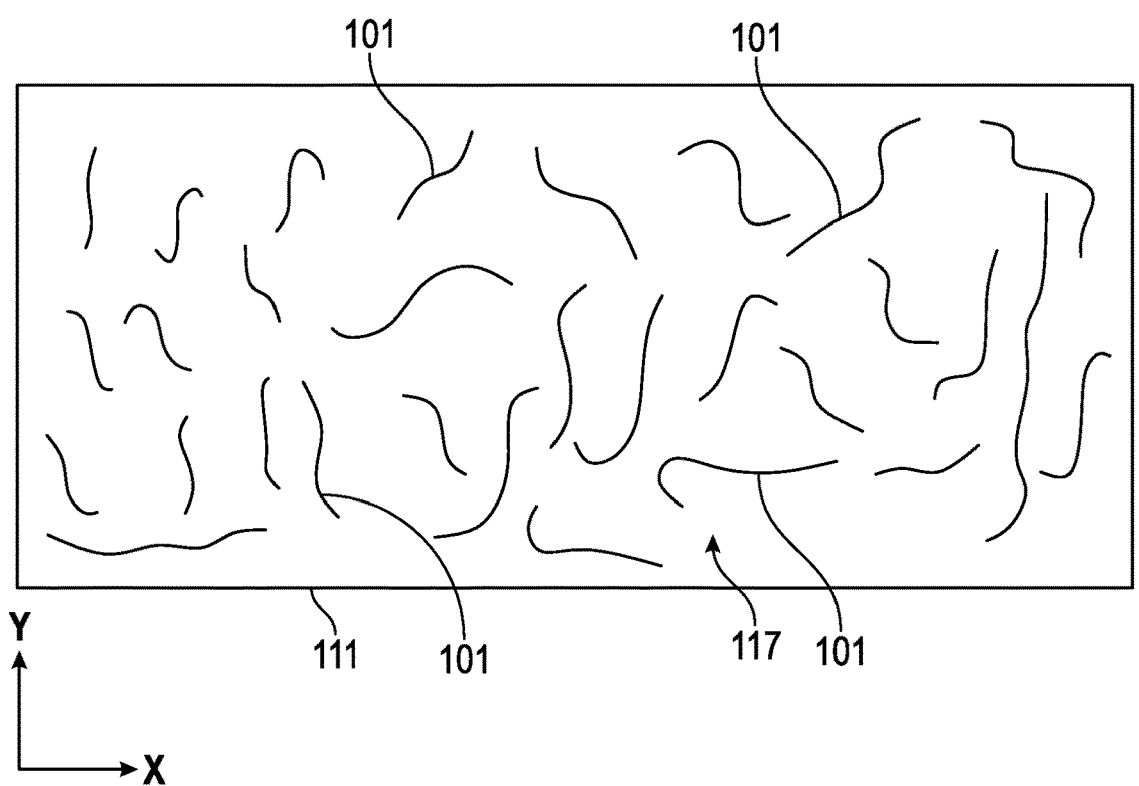
FIG. 8 is a simplified schematic top view of a uniformly arranged single cell sample on a substrate prepared by an on-the-fly dispensing technique with a substantially discrete arrangement of chromosomes for karyotyping illustrating features and advantages in accordance with certain embodiments of the invention.
Figure 9:
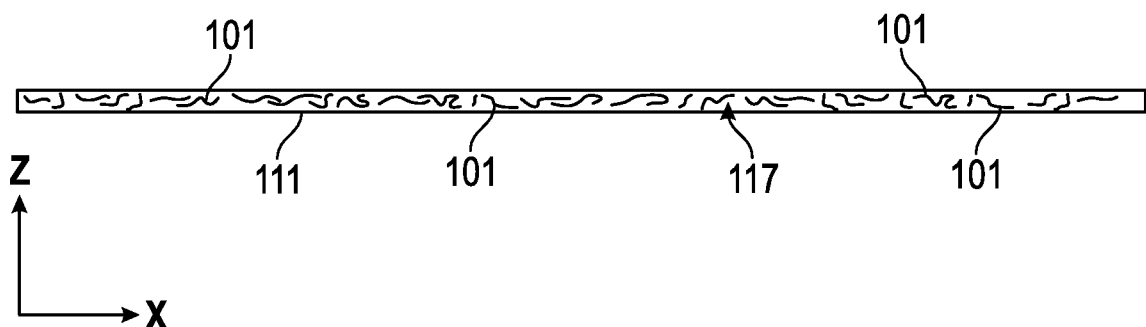
FIG. 9 is a simplified side view of the chromosome arrangement of FIG. 8 illustrating features and advantages in accordance with certain embodiments of the invention.

In accordance with certain embodiments, FIGS. 8 and 9 are simplified schematic views of a uniformly arranged single cell sample 117 on the substrate 111 prepared by an on-the-fly dispensing technique with a substantially uniform and discrete arrangement of chromosomes 101 for karyotyping. Advantageously, this allows for accurate, repeatable and consistent analysis of the chromosomes 101 for karyotyping.

Figure 10:
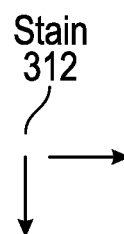
FIG. 10 is a simplified side view of a staining process in association with the chromosome arrangement of FIGS. 8 and 9 illustrating features and advantages in accordance with certain embodiments of the invention.
Figure 10:
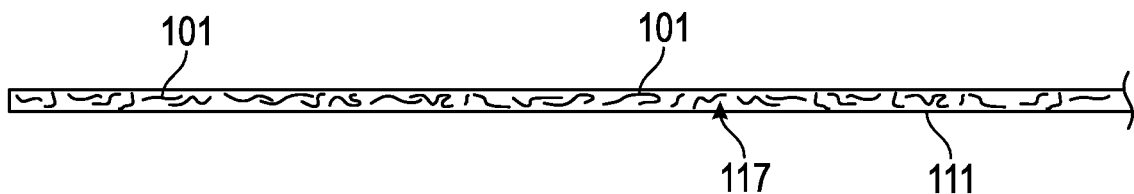

In accordance with certain embodiments, FIG. 10 is a simplified side view of a staining process in association with the chromosome arrangement of FIGS. 8 and 9. The staining reagent, liquid or probe is 312 is applied to the chromosomes 101 and results in a desired stain arrangement at least in part due to the discrete arrangement of the chromosomes 101 of the cell sample 117 on the substrate 111.

Figure 11:
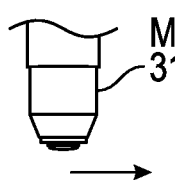
FIG. 11 is a simplified side view of a microscopic process for karyotyping analysis in association with the chromosome arrangement and staining process of FIGS. 8, 9 and 10 illustrating features and advantages in accordance with certain embodiments of the invention.
Figure 11:
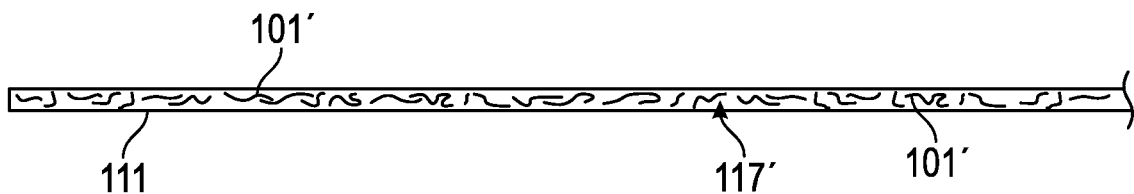

FIG. 11 is a simplified side view of a microscopic process for karyotyping analysis in association with the chromosome arrangement and staining process of FIGS. 8, 9 and 10 illustrating features and advantages in accordance with certain embodiments of the invention. The microscope or other imaging device 314 can accurately analyze the stained chromosomes 101' of the stained cell sample 117' due to the efficacious and discrete arrangement formed thereof on the substrate 111.

Some Advantages of Embodiments of the Invention

One advantage of certain embodiments of the disclosed methods is that the use of an automated method to apply cells from a cell suspension of a particular cell sample to a substrate or slide(s) makes the laboratory process more efficient. The conventional manual method of applying cells to slides is undesirably highly variable and makes it difficult to obtain repeatable results from day to day and from technician to technician. Some embodiments of the method enable the use of automation in a way that generates the desired outcome (e.g., accurately and properly spread cells of the cell sample and its chromosomes for karyotyping analysis).

Another advantage of certain embodiments of the disclosed methods is that superior results are obtained as compared to other methods. The number of quality spread cells and the dispersion of cells and chromosomes of the cell sample on the substrate or slide is improved significantly when using the novel, unique and inventive method of embodiments of the invention.

Yet another advantage is that the spreading of cells and chromosomes on the substrate or slide can be controlled easily and precisely by adjusting the number, spacing and volume, and forward velocity of drops applied to the substrate or slide.

Advantageously, the dispensed droplet spreads in a predetermined manner on the substrate surface to occupy a predetermined area in conjunction with other dispensed spots to form a uniform, even, reproducible and repeatable spreading and distribution of cells and/or chromosomes on the substrate for karyotyping purposes.

Another advantage is that the desirable quality of chromosome spreading impacts how well the later dispensed stain(s) interacts with the chromosomes. The chromosomes subsequently are advantageously displayed in an easy and efficient manner to be analyzed by a microscope, imaging device or the like.

Other advantages include, without limitation: the dispensing systems precision and repeatability with respect to size (length and width) and location of the printed area enhances the efficiency of automated imaging systems; the length of the printed area can be adjusted from about 1 mm to about 75 mm; the width of the printed area can be adjusted from about 1 mm to about 25 mm; the location of the printed area on the substrate or slide can be adjusted from 0 to about 75 mm from the substrate or slide origin with respect to the long axis of the substrate or slide; the location of the printed area on the substrate or slide can be adjusted from 0 to about 25 mm from the substrate or slide origin with respect to the short axis of the substrate or slide; precision defining of the printed area on the substrate or slide, can desirably allow for more than one sample application to a single substrate or slide; the possible number of samples printed on the substrate or slide can range from 1 to about 100 or more; the substrate on which the cells of the cell sample are dispensed may be a glass slide, nitrocellulose membrane, a plastic membrane, a nylon membrane, or a nylon membrane on a continuous roll; a surface modifier may be used to improve the quality of cell spreading and cell adhesion—the surface modifier may be poly-L-lysine, amines, streptavidin, epoxy, metal film, or dielectric materials, among others, and the like; the slide or substrate on which the cells are dispensed may consist of a barcode and a hydrophobic layer to further define the printed area—the hydrophobic area can also be used to mechanically separate multiple cells on the single substrate or slide.

Clauses

Particular aspects of the disclosure and/or embodiments of the invention(s) are set out in at least the following numbered clauses, any of which may be combined as appropriate, needed or desired to achieve at least the objective(s) of preparing a cell sample for karyotyping for reproducible, repeatable, accurate, efficient and consistent overall performance, and subsequent analysis, with respect to creating at least a homogeneous arrangement of chromosomes or other genetic or DNA material on one or more substrates.

1. A method of printing a cell sample for karyotyping, comprising:
dispensing droplets from a moving nozzle onto a substrate, said dispensing comprising on-the-fly dispensing of cells on the substrate; and
controlling at least one of the speed of the nozzle, the distance between the nozzle and the substrate, and the impact velocity of the droplets onto the substrate such that the cell sample is dispersed uniformly on the substrate with a substantially discrete arrangement of chromosomes of the cell sample to provide for accurate and efficient karyotyping preparation and/or analysis.

2. The method of Clause 1, wherein the printing involves matrix printing of the cell sample.

3. The method of Clause 1 or 2, wherein the method further comprises staining the cell sample and/or chromosomes.

4. The method of any one of the preceding clauses, wherein the method further comprises a microscopic or imaging analysis of the cell sample and/or chromosomes.

5. The method of any one of the preceding clauses, wherein the method is an automated method controlled by a controller.

6. The method of any one of the preceding clauses, wherein spreading of the cell sample and/or chromosomes is controlled by adjusting the number, spacing and volume, and forward velocity of the droplets applied to the substrate.

7. The method of any one of the preceding clauses, wherein the method further comprises adjusting a print area of the cell sample on the substrate such that its length is in the range from about 1 mm to about 75 mm.

8. The method of any one of the preceding clauses, wherein the method further comprises adjusting a print area of the cell sample on the substrate such that its width is in the range from about 1 mm to about 25 mm.

9. The method of any one of the preceding clauses, wherein the method further comprises precision definition of a printed area on the substrate to allow for more than one sample application to a single substrate 10. The method of Clause 9, wherein the possible number of samples printed on the substrate can range from 1 to about 100 or more.

11. The method of any one of the preceding clauses, wherein the substrate is selected from the group consisting of a glass slide, nitrocellulose membrane, a plastic membrane, a nylon membrane, or a nylon membrane on a continuous roll.

12. The method of any one of the preceding clauses, wherein the substrate comprises a surface modifier to improve the quality of cell spreading and cell adhesion.

13. The method of Clause 12, wherein the surface modifier is selected from a group consisting of poly-L-lysine, amines, streptavidin, epoxy, metal film, and dielectric materials.

14. The method of any one of the preceding clauses, wherein the substrate on which the cells are dispensed comprises a barcode.

15. The method of any one of the preceding clauses, wherein the substrate on which the cells are dispensed comprises a hydrophobic layer.

16. The method of any one of the preceding clauses, wherein the hydrophobic layer further defines a printed area which is adapted to further mechanically separate multiple cells on the substrate.

17. The method of any one of the preceding clauses, wherein during dispensing the nozzle is arranged substantially perpendicularly to the substrate.

18. The method of any one of the preceding clauses, wherein the dispensing comprises line mode dispensing in which droplets of a predetermined size are dispensed onto the substrate by the nozzle to generate a line of individual spots with a specific spacing and volume, and/or spot size.

19. The method of any one of the preceding clauses, wherein the momentum transfer to the dispensed cells from the moving nozzle creates a cell rolling effect on the substrate and improves cell spreading and/or chromosome dispersion.

20. The method of any one of the preceding clauses, wherein the substrate is substantially parallel to a work platform on which it is positioned or substantially perpendicular to a long axis of the nozzle.

21. The method of any one of the preceding clauses, wherein the nozzle is part of a print head, and wherein the speed of the print head can be adjusted from about 5 mm/sec to about 150 mm/sec in order to increase or decrease the amount of forward momentum applied to the cells as they impact the substrate.

22. The method of any one of the preceding clauses, wherein a syringe pump is used to provide cells to the nozzle, and wherein the speed of the syringe pump can be adjusted from about 1 μL/sec to about 100 μL/sec in order to increase the velocity of the droplets in flight and/or to affect the forward momentum applied to the cells as they impact the substrate.

23. The method of any one of the preceding clauses, wherein the droplet volume can be adjusted from about 100 nl to about 4 μL in order to increase or decrease the amount of forward momentum applied to the cells as they impact the substrate.

24. The method of any one of the preceding clauses, wherein the cell spot spacing on the substrate can be adjusted from about 0.1 mm to about 10 mm between spots.

25. The method of any one of the preceding clauses, wherein the number of lines or rows of cells per substrate can be adjusted from 1 to about 200.

26. The method of any one of the preceding clauses, wherein the number of droplets per line can be adjusted from about 5 to about 200.

27. The method of any one of the preceding clauses, wherein prior to dispensing a matrix of cells on the substrate the dispenser mixes the cells in a source reservoir so that there is a substantially homogeneous mixture of cells in a dispense tip of the nozzle.

28. The method of any one of the preceding clauses, wherein the chromosomes of the cell sample are distinctly identifiable on the substrate.

29. The method of any one of the preceding clauses, wherein the arrangement of chromosomes of the cell sample on the substrate is configured for optimized staining.

30. The method of any one of the preceding clauses, wherein the arrangement of chromosomes of the cell sample on the substrate is configured for optimized microscopic or imaging analysis.

1b. A method of printing, such as matrix printing, of at least one cell sample for karyotyping comprising: dispensing droplets from a moving nozzle onto a surface, said dispensing comprising on-the-fly dispensing of cells on the surface; and adjusting the speed of the nozzle to adjust the forward momentum applied to the cells when they are dispensed onto the surface so as to accurately spread the cells and/or chromosomes on the surface in preparation for karyotyping analysis.

2b. The method of Clause 1b, wherein the surface is part of a substrate.

3b. The method of Clause 2b, wherein the substrate comprises a glass slide.

4b. The method of Clause 2b, wherein the substrate comprises a nylon membrane, a plastic membrane or a nitrocellulose membrane.

5b. The method of any one of Clauses 1b to 4b, wherein the dispensing comprises line mode dispensing in which small droplets are dispensed onto the surface by the nozzle to generate a line of individual droplets with a specific spacing and volume, and/or spot size.

6b. The method of Clause 1b to 5b, wherein the momentum transfer to the dispensed cells from the moving nozzle creates a cell rolling effect on the surface and improves cell spreading and/or discrete chromosome distribution of the cell sample.

7b. The method of any one of Clauses 1b to 6b, wherein the surface is substantially parallel to a work platform on which it is positioned or substantially perpendicular to a long axis of the nozzle.

8b. The method of any one of Clauses 1b to 7b, wherein the nozzle is part of a print head, and wherein the speed of the print head can be adjusted from about 5 mm/sec to about 150 mm/sec in order to increase or decrease the amount of forward momentum applied to the cells as they impact the surface such as a slide or substrate surface.

9b. The method of any one of Clauses 1b to 8b, wherein a syringe pump is used to provide cells to the nozzle, and wherein the speed of the syringe pump can be adjusted from about 1 μL/sec to about 100 μL/sec in order to increase the velocity of the droplets in flight and/or to affect the forward momentum applied to the cells as they impact the surface.

10b. The method of any one of Clauses 1b to 9b, wherein the droplet volume of can be adjusted from about 100 nl to about 4 μL in order to increase or decrease the amount of forward momentum applied to the cells as they impact the surface of a slide or substrate.

11b. The method of any one of Clauses 1b to 10b, wherein the cell spot spacing on the surface can be adjusted from about 0.1 mm to about 10 mm between spots.

12b. The method of any one of Clauses 1b to 11b, wherein the number of lines or rows of cells per surface of a slide or substrate can be adjusted from 1 to about 200.

13b. The method of any one of Clauses 1b to 12b, wherein the number of droplets per line on the surface can be adjusted from about 5 to about 200.

14b. The method of any one of Clauses 1b to 13b, wherein prior to dispensing a matrix of cells on the surface a dispenser mixes the cells in a source reservoir so that there is a substantially homogeneous mixture of cells in a dispense tip of the nozzle; this can advantageously contribute to the consistency of cell dispersion and/or chromosome on the surface of a substrate or slide.

1c. A method of karyotyping that involves providing a momentum transfer to dispensed droplets created by the disclosed 'Line Mode' to recreate or compensate, in some embodiments, for a cell rolling phenomenon achieved in the conventional manual method of angling slides for karyotyping; the "cell rolling" effect being understood to improve spreading of cells for karyotyping, therefore, the 'Line Mode' method improves on cell spreading and discrete chromosome distribution on the slide or other substrate.

2c. The method of Clause 1c, wherein the momentum transfer created by the 'Line Mode' advantageously allows for proper spread of cells and/or chromosomes for karyotyping when the receiving substrate or slide is at about zero degrees with respect to the work surface.

3c. The method of Clause 1c or 2c, wherein the speed or velocity of a droplet dispensing print head can be adjusted from about 5 mm/sec to about 150 mm/sec in order to increase or decrease the amount of forward momentum applied to the cells of the cell sample as they impact the substrate or slide.

4c. The method of any one of Clauses 1c to 3c, wherein the speed of a dispensing syringe pump can be adjusted from about 1 μL/sec to about 100 μL/sec in order to increase the velocity of the droplet in flight and to control the affect the forward momentum applied to the cells and/or chromosomes as they impact the substrate or slide.

5c. The method of any one of Clauses 1c to 4c, wherein the volume of the droplets can be adjusted from about 100 nl to about 4 μL in order to increase or decrease the amount of forward momentum applied to the cells as they impact the substrate or slide.

6c. The method of any one of Clauses 1c to 5c, wherein the method has the ability to apply one or more substrates or slides as a matrix of small dots which enables control in cell dispersion on the substrate or slide that is not available in the conventional manual method that deploys large dispense volumes, for example, between 1 and 5 large drops (greater than 10 μL per drop) to the top of an angled slide, thus allowing the velocity of dispense and gravity to cause the cells to disperse; embodiments of the disclosed automated method considerably increase the level of control when dispersing cells on the substrate or slide.

7c. The method of any one of Clauses 1c to 6c, wherein cell spot spacing can be adjusted from about 0.1 mm to about 10 mm between spots.

8c. The method of any one of Clauses 1c to 7c, wherein the number of lines or rows of cells per substrate or slide can be adjusted from 1 to about 200.

9c. The method of Clause 8c, wherein the number of drops per line can be adjusted from about 5 to about 200.

10c. The method of any one of Clauses 1c to 9c, wherein the cell distribution and/or matrix print can be applied, in some cases, by a step and repeat process.

11c. The method of any one of Clauses 1c to 10c, wherein the volume of a dispensed droplet can be adjusted between about 100 nl and about 4 μL to effect the cell dispersion on the slide (dpi).

12c. The method of any one of Clauses 1c to 11c, wherein prior to performing the line dispense or creation of a matrix of small dots of a predetermined size on the substrate or slide, a droplet providing dispenser can mix the cells in a source reservoir before dispensing them on the substrate or slide; this desirably can ensure that there is a homogeneous mixture of cells in a dispense tip of the dispenser and contributes to the consistency of cell dispersion and/or chromosome arrangement on the substrate or slide.

CONCLUSION

Any methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention.

It is to be understood that any range of values disclosed, taught or suggested herein comprises all values and sub-ranges therebetween. For example, a range from 5 to 10 will comprise all numerical values between 5 and 10 and all sub-ranges between 5 and 10.

From the foregoing description, it will be appreciated that a novel approach for karyotyping has been disclosed. While the components, techniques and aspects of the invention have been described with a certain degree of particularity, it is manifest that many changes may be made in the specific designs, constructions and methodology herein above described without departing from the spirit and scope of this disclosure.

While a number of preferred embodiments of the invention and variations thereof have been described in detail, other modifications and methods of using and applications for the same will be apparent to those of skill in the art, such as, but not limited to: (i) diagnostics applications, including without limitation medical, veterinary, human, agricultural, food and/or clinical usage; (ii) life sciences and pharmaceutical research and applications, including without limitation genomic and proteomic related research and drug discovery and development, combinatorial chemistry, high throughput screening and/or crystallography; and (iii) material sciences applications, including without limitation combinatorial investigations for the development of new materials which may include combinatorial methods in drug discovery and development. Accordingly, it should be understood that various applications, modifications, and substitutions may be made of equivalents without departing from the spirit of the invention or the scope of the claims.

Various modifications and applications of the invention may occur to those who are skilled in the art, without departing from the true spirit or scope of the invention. It should be understood that the invention is not limited to the embodiments set forth herein for purposes of exemplification, but is to be defined only by a fair reading of the appended claims, including the full range of equivalency to which each element thereof is entitled.

What is claimed is:

1. A method of printing a cell sample for karyotyping from a plurality of droplets containing cells, comprising:
   dispensing the plurality of droplets containing cells from a moving nozzle onto a print area of a substrate, the dispensing comprising on-the-fly dispensing of the plurality of droplets on the substrate such that the plurality of droplets coalesce into the cell sample within the print area; and
   controlling at least one of a speed of the moving nozzle between about 5 mm/sec and about 150 mm/sec, a distance between the moving nozzle and the substrate, and an impact velocity of the droplets onto the substrate in order to adjust an amount of forward momentum transferred to the droplets from the moving nozzle and induce cell rolling on the substrate such that the cell sample is dispersed uniformly on the substrate and individual chromosomes in the cell sample can be distinguished from other chromosomes within the cell sample; and
   drying the droplets on the substrate such that the cells of the cell sample adhere to the substrate.

2. The method of claim 1, wherein the printing involves matrix printing of the cell sample.

3. The method of claim 1, wherein the method further comprises a microscopic or imaging analysis of the cell sample and/or chromosomes.

4. The method of claim 3, wherein the method is an automated method controlled by a controller.

5. The method of claim 1, wherein spreading of the cell sample and/or chromosomes is controlled by adjusting the number, spacing and volume, and forward velocity of the droplets applied to the substrate.

6. The method of claim 5, wherein the method further comprises adjusting the print area of the cell sample on the substrate such that its length is in the range from about 1 mm to about 75 mm.

7. The method of claim 6, wherein the method further comprises adjusting the print area of the cell sample on the substrate such that its width is in the range from about 1 mm to about 25 mm.

8. The method of claim 1, wherein the method further comprises defining the print area on the substrate to allow for more than one sample application to a single substrate.

9. The method of claim 8, wherein the possible number of samples printed on the substrate can range from 1 to about 100.

10. The method of claim 1, wherein the substrate is selected from the group consisting of a glass slide, nitrocellulose membrane, a plastic membrane, a nylon membrane, or a nylon membrane on a continuous roll.

11. The method of claim 1, wherein the substrate comprises a surface modifier to improve the quality of cell spreading and cell adhesion.

12. The method of claim 11, wherein the surface modifier is selected from a group consisting of poly-L-lysine, amities, streptavidin, epoxy, metal film, and dielectric materials.

13. The method of claim 11, wherein the substrate on which the cells are dispensed comprises a barcode.

14. The method of claim 1, wherein the substrate on which the cells are dispensed comprises a hydrophobic layer.

15. The method of claim 14, wherein the hydrophobic layer further defines the print area which is adapted to further mechanically separate multiple cells on the substrate.

16. The method of claim 1, wherein during dispensing the nozzle is arranged perpendicularly to the substrate.

17. The method of claim 1, wherein the dispensing comprises line mode dispensing in which droplets of a predetermined size are dispensed onto the substrate by the nozzle to generate a line of individual spots with a specific spacing and volume, and/or spot size.

18. The method of claim 1, wherein the substrate is parallel to a work platform on which it is positioned or perpendicular to a long axis of the nozzle.

19. The method of claim 1, wherein a syringe pump is used to provide cells to the nozzle, and wherein the speed of the syringe pump can be adjusted from about 1 μL/sec to about 100 μL/sec in order to increase the velocity of the droplets in flight and/or to affect the forward momentum applied to the cells as they impact the substrate.

20. The method of claim 1, wherein the droplet volume can be adjusted from about 100 nl to about 4 μL in order to increase or decrease the amount of forward momentum applied to the cells as they impact the substrate.

21. The method of claim 1, wherein the cell spot spacing on the substrate can be adjusted from about 0.1 mm to about 10 mm between spots.

22. The method of claim 1, wherein the number of lines or rows of cells per substrate can be adjusted from 1 to about 200.

23. The method of claim 1, wherein the number of droplets per line can be adjusted from about 5 to about 200.

24. The method of claim 1, wherein prior to dispensing a matrix of cells on the substrate the dispenser mixes the cells in a source reservoir so that there is a substantially homogeneous mixture of cells in a dispense tip of the nozzle.

25. The method of claim 1, wherein the chromosomes of the cell sample are distinctly identifiable on the substrate.

26. The method of claim 1, further comprising staining the cell sample for karyotyping analysis.

27. The method of claim 25, wherein the arrangement of chromosomes of the cell sample on the substrate is configured for microscopic or imaging analysis.

28. A method of printing a cell sample for karyotyping, from a plurality of droplets containing cells comprising:
dispensing the plurality of droplets containing cells from a moving nozzle onto a predetermined area of a surface, the dispensing comprising on-the-fly dispensing of the cells on the surface; and
wherein the moving nozzle imparts a forward momentum to the droplets to disperse the cells contained in the droplets evenly across the surface;
wherein the droplets in the predetermined area of the surface join after impacting the surface to form the cell sample; and
drying the droplets on the substrate.

29. The method of claim 28, wherein the printing involves matrix printing of at least one cell sample.

30. The method of claim 29, wherein the surface is part of a substrate.

31. The method of claim 30, wherein the substrate comprises a glass slide.

32. The method of claim 30, wherein the substrate comprises a nylon membrane, a plastic membrane or a nitrocellulose membrane.

33. The method of claim 31, wherein the dispensing comprises line mode dispensing in which the droplets are dispensed onto the surface by the nozzle to generate a line of individual droplets with a specific spacing and volume, and/or spot size.

34. The method of claim 33, wherein the surface is parallel to a work platform on which it is positioned or perpendicular to a long axis of the nozzle.

35. The method of claim 34, wherein a syringe pump is used to provide cells to the nozzle, and wherein the speed of the syringe pump can be adjusted from about 1 μL/sec to about 100 μL/sec in order to increase the velocity of the droplets in flight and/or to affect the forward momentum applied to the cells as they impact the surface.

36. The method of claim 35, wherein the droplet volume can be adjusted from about 100 nl to about 4 μL in order to increase or decrease the amount of forward momentum applied to the cells as they impact the surface or a substrate or slide.

37. The method of claim 36, wherein the cell spot spacing on the surface can be adjusted from about 0.1 mm to about 10 mm between spots.

38. The method of claim 37, wherein the number of lines or rows of cells per surface can be adjusted from 1 to about 200.

39. The method of claim 38, wherein the number of droplets per line can be adjusted from about 5 to about 200.

40. The method of claim 39, wherein prior to dispensing a matrix of cells on the surface through the plurality of droplets, the dispenser mixes the cells in a source reservoir so that there is a mixture of cells in a dispense tip of the nozzle.

41. A method of printing a single cell sample for karyotyping from a plurality of droplets containing cells, comprising:
dispensing the plurality of droplets containing cells from a moving nozzle onto a print area of a substrate, droplets of the plurality of droplets each forming a cell sample spot on the substrate;
controlling a spacing of the cell sample spots and a spreading of the cell sample spots such that the cell sample spots form the single cell sample within the print area; and
drying the droplets;
wherein the single cell sample is dispersed across the substrate such that individual chromosomes in the single cell sample can be distinguished from other chromosomes for karyotyping analysis.

42. The method of claim 41, further comprising staining the single cell sample for karyotyping analysis.

43. The method of claim 41, wherein controlling the spacing and the spreading of the cell sample spots includes adjusting at least one of the speed of the nozzle, a distance between the nozzle and the substrate; and the impact velocity of the droplets onto the substrate.

44. A method of karyotyping, comprising:
providing an automated apparatus configured for on-the-fly dispensing of droplets through a moving nozzle onto a substrate, wherein the nozzle velocity is adjustable between about 5 mm/sec and 150 mm/sec, and the droplet volume is adjustable between about 100 nl and 4 μl;

dispensing a single droplet containing metaphase cells from the moving nozzle onto a predetermined area of the substrate;

adjusting the velocity of the moving nozzle and the droplet volume, such that chromosomes within the metaphase cells spread within the predetermined area until individual chromosomes can be uniquely identified and distinguished from other chromosomes in the metaphase cells; and drying the cell sample within the predetermined area.

45. The method of claim 44, wherein the predetermined area has been modified to improve cell spreading.

46. The method of claim 44, further comprising staining the dispensed metaphase cells on the substrate for karyotyping analysis.

47. The method of claim 44, further comprising dispensing a number of lines of droplets containing metaphase cells onto the predetermined area of the substrate, wherein the number of lines of droplets can be adjusted from 1 to about 200.

48. The method of claim 47, wherein a number of droplets per line can be adjusted from about 5 to about 200.

49. The method of claim 28, wherein the nozzle is part of a print head, and wherein the speed of the print head can be adjusted from about 5 mm/sec to about 150 mm/sec in order to increase or decrease the amount of forward momentum applied to the cells as they impact the surface of a substrate or slide.

* * * * *